(12) United States Patent
Lee et al.

(10) Patent No.: US 11,645,979 B2
(45) Date of Patent: May 9, 2023

(54) DISPLAY DEVICE AND DRIVING METHOD THEREOF

(71) Applicant: LG Display Co., Ltd., Seoul (KR)

(72) Inventors: Cheol Su Lee, Paju-si (KR); Joon Keun Song, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/509,632

(22) Filed: Oct. 25, 2021

(65) Prior Publication Data

US 2022/0139325 A1 May 5, 2022

(30) Foreign Application Priority Data

Nov. 4, 2020 (KR) .................. 10-2020-0146129

(51) Int. Cl.
*G09G 3/3266* (2016.01)
(52) U.S. Cl.
CPC ... *G09G 3/3266* (2013.01); *G09G 2310/0286* (2013.01); *G09G 2310/0289* (2013.01); *G09G 2310/08* (2013.01); *G09G 2320/0673* (2013.01)
(58) Field of Classification Search
None
See application file for complete search history.

(56) References Cited

U.S. PATENT DOCUMENTS

| 2018/0315375 | A1* | 11/2018 | Zhang | G09G 3/3258 |
| 2020/0004084 | A1 | 1/2020 | Nishihara et al. | |
| 2020/0074938 | A1 | 3/2020 | Kim | |
| 2020/0082759 | A1 | 3/2020 | Lee et al. | |
| 2020/0175928 | A1* | 6/2020 | Baek | G09G 3/3291 |
| 2020/0184867 | A1* | 6/2020 | Choi | G09G 3/006 |
| 2021/0271302 | A1* | 9/2021 | Hsia | G06F 13/42 |

FOREIGN PATENT DOCUMENTS

| KR | 10-2020-0026522 A | 3/2020 |
| WO | 2020/091795 A1 | 5/2020 |

* cited by examiner

*Primary Examiner* — Christopher J Kohlman
(74) *Attorney, Agent, or Firm* — Seed IP Law Group LLP

(57) ABSTRACT

The present disclosure relates to a display device and a driving method thereof. The display device includes a sensing unit configured to sense electrical properties of each of pixels; a timing controller including a compensation unit configured to modulate pixel data to be written to the pixels based on sensed data from the sensing unit, a sensing error processing unit configured to analyze the sensed data to detect a sensing error, and a gate control unit configured to output a gate timing control signal; a level shifter configured to receive the gate timing control signal and output a clock; and a gate driver configured to receive the clock from the level shifter and supplying a gate signal to the gate lines, wherein the sensing error processing unit resets the timing controller when the sensing error is detected.

19 Claims, 26 Drawing Sheets

| A1 Average − B1 Average | = C1
| A2 Average − B2 Average | = C2
⋮
| A135 Average − B135 Average | = C135

DISPLAY DEVICE AND DRIVING METHOD THEREOF

CROSS-REFERENCE TO RELATED APPLICATION

This application claims priority to and the benefit of Korean Patent Application No. 10-2020-0146129, filed Nov. 4, 2020, the disclosure of which is incorporated herein by reference in its entirety.

BACKGROUND

Technical Field

The present disclosure relates to a display device capable of reducing an afterimage by reducing deterioration of a transistor used as a driving element of a pixel, and a driving method thereof.

Description of the Related Art

Electroluminescent display devices are roughly classified into inorganic light emitting display devices and organic light emitting display devices, depending on the material of an emission layer. The organic light emitting display device of an active matrix type includes an organic light emitting diode (hereinafter referred to as "OLED") that emits light by itself, and has an advantage in that the response speed is fast and the luminous efficiency, luminance, and viewing angle are large.

Pixels of the organic light emitting display device include an OLED and a driving element that drives the OLED by supplying a current to the OLED according to a gate-source voltage. The OLED of the organic light emitting display device includes an anode electrode and a cathode electrode, and an organic compound layer formed between the electrodes. The organic compound layer is formed of a hole injection layer (HIL), a hole transport layer (HTL), an emission layer (EML), an electron transport layer (ETL), and an electron injection layer (EIL). When a current flows through the OLED, holes passing through the hole transport layer (HTL) and electrons passing through the electron transport layer (ETL) move to the emission layer (EML) to form excitons, and as a result, the emission layer (EML) generates visible light.

The organic light emitting display device includes a display panel driver for writing pixel data of an input image into the pixels. When circuits in the display panel driver are not synchronized with each other, an image reproduced on the screen may be distorted or noise may be seen.

BRIEF SUMMARY

In a display panel of the organic light emitting display device, power lines for supplying power to the pixels are disposed. When a short circuit occurs between the power lines, an overcurrent flows in a pixel circuit. The short circuit in the power lines may be caused by internal structural factors such as particles mixed into the display panel during the manufacturing process (or module process), cracks in the display panel, mis-alignment between a drive integrated circuit (IC) and a pad portion of the display panel, and a narrow wiring layout of the display panel, or external factors such as static electricity. When the short circuit occurs between the power lines, the display panel burns, and if an overcurrent continuously flows, the burning spreads.

The organic light emitting display device may sense the electrical properties of the driving element for each pixel and modulate the pixel data based on the sensed result, thereby compensating for a deviation in the electrical properties of the driving element between the pixels and a change over time. The inventors have appreciated that if the sensed data is inaccurate or lost, or if the pixel and sensed data are not matched, noise may be seen on the screen.

One or more embodiments of the present disclosure addresses the various technical problems in the related art as well as the aforementioned problem identified by the inventors.

The present disclosure provides a display device capable of preventing deterioration of image quality due to an error in sensed data and a driving method thereof.

It should be noted that technical benefits of the present disclosure are not limited to the above-described benefits, and other benefits of the present disclosure will be apparent to those skilled in the art from the following descriptions.

A display device of the present disclosure includes a display panel including a plurality of data lines, a plurality of gate lines, and a plurality of pixel lines coupled to the data lines and the gate lines and having pixels arranged therein, a sensing circuit configured to sense electrical properties of each of the pixels, a timing controller, a level shifter, and a gate driver. The timing controller includes a compensation circuit configured to modulate pixel data to be written to the pixels based on sensed data from the sensing circuit, a sensing error processing circuit configured to analyze the sensed data to detect a sensing error, and a gate control circuit configured to output a gate timing control signal.

The level shifter converts a voltage of the gate timing control signal. The gate driver receives the gate timing control signal from the level shifter to supply a gate signal to the gate lines.

The sensing error processing circuit resets the timing controller when the sensing error is detected.

A method of driving the display device includes: sensing, for each of pixels of a display panel, electrical properties of the pixels to generate a sensed data; analyzing the sensed data to detect a sensing error; and resetting a timing controller configured to control an operation timing of a display panel driver that drives the display panel, when the sensing error is detected.

The present disclosure may prevent deterioration in image quality of the display panel by resetting the timing controller when an error in the sensed data is detected and blocking a pixel driving voltage when an error in the sensed data is repeated. The present disclosure may prevent the display panel from burning by blocking a pixel driving voltage when the pixel driving voltage is short-circuited in the display panel.

The present disclosure may predict a synchronization failure between level shifters by analyzing the sensed data when controlling a gate driver using a plurality of level shifters.

Effects of the present disclosure are not limited to the above-described effects, and other effects which are not mentioned can be apparently understood by those skilled in the art from a disclosure of claims.

BRIEF DESCRIPTION OF THE SEVERAL VIEWS OF THE DRAWINGS

The above and other features, and advantages of the present disclosure will become more apparent to those of ordinary skill in the art by describing embodiments thereof in detail with reference to the attached drawings, in which.

DETAILED DESCRIPTION

Figure 1:
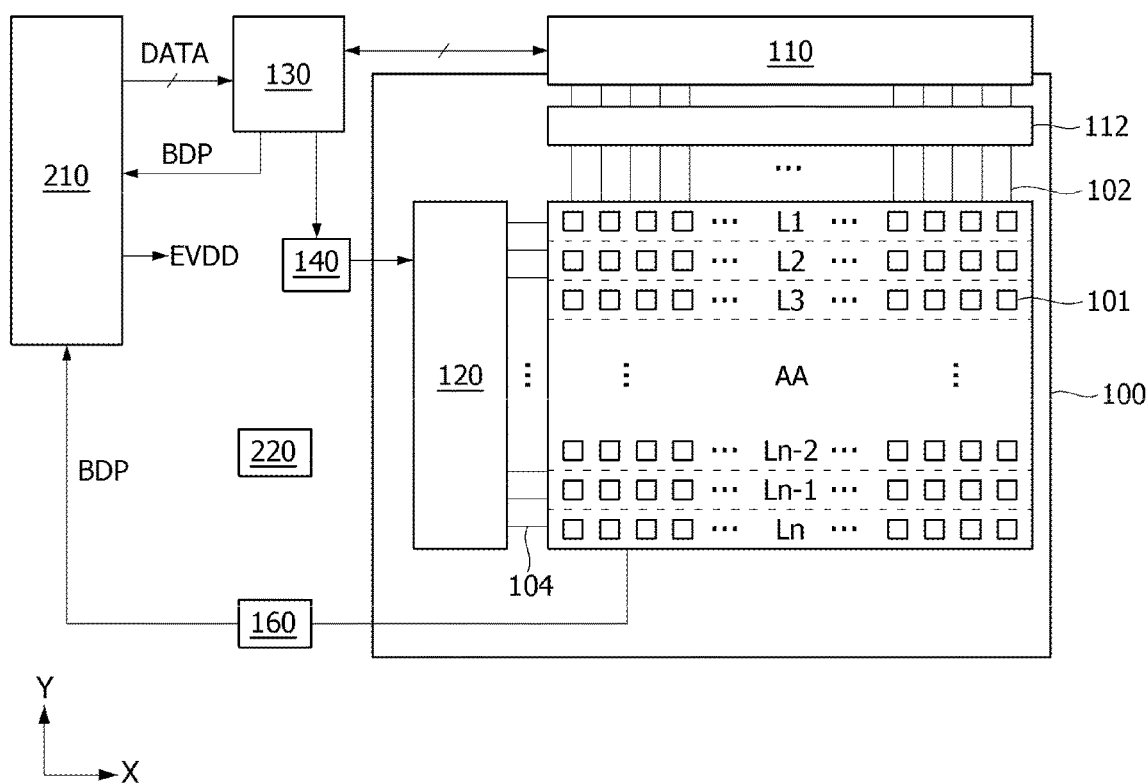
FIG. 1 is a block diagram showing a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals refer to the same elements throughout the description.

The term "unit" may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit."

In some embodiments, the various units described herein may be included in or otherwise implemented by processing circuitry such as a microprocessor, microcontroller, or the like.

The following embodiments may be partially or entirely combined or associated with each other, and technically, various interlocking and driving are possible. The embodiments may be implemented independently of each other or may be implemented together in a related relationship.

A display device of the present disclosure includes a driving element for driving a light emitting element (OLED) in each of pixels. The driving element may be implemented with a TFT having a metal oxide semiconductor field effect transistor (MOSFET) structure. It is beneficial for the electrical properties of driving elements to be uniform among all pixels, but the electrical properties may differ between pixels due to process deviation and element properties deviation, and may change over the lapse of driving time of the display. In order to compensate for such a deviation in the electrical properties of the driving element, an external compensation circuit may be applied. The external compensation circuit senses the electrical properties of the driving element in each pixel and modulates pixel data of an input image based on a sensed result of each pixel, thereby compensating for a deviation in the electrical properties of the driving elements for pixels and a variation in the electrical properties over driving time.

Hereinafter, various embodiments of the present disclosure will be described in detail with reference to the accompanying drawings. In the following embodiments, the display device of the present disclosure will be described focusing on an example to which the external compensation circuit is applied.

Figure 2:
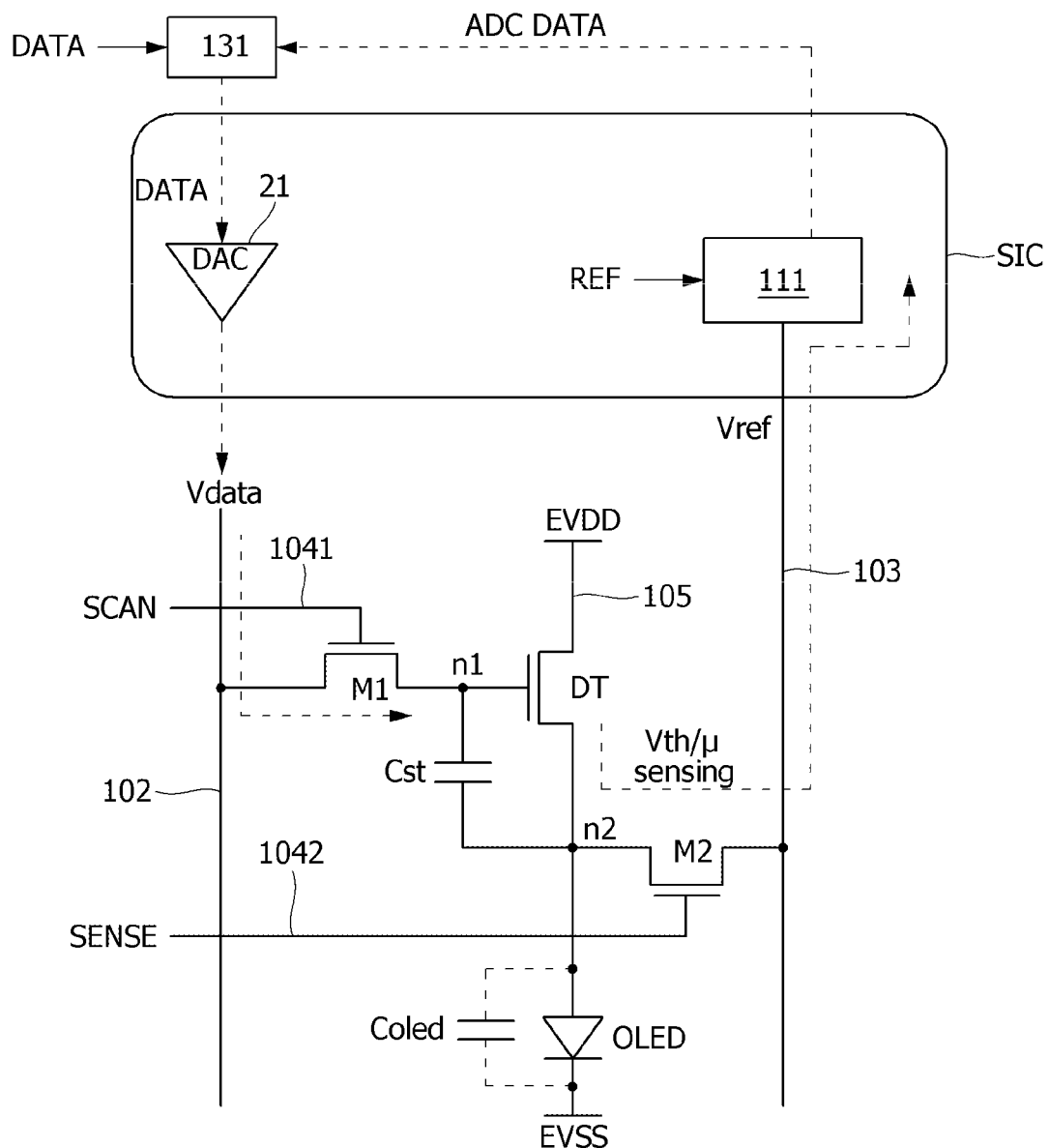
FIG. 2 is a circuit diagram showing an external compensation circuit connected to a pixel circuit.

FIG. 1 is a block diagram showing a display device according to an embodiment of the present disclosure. FIG. 2 is a circuit diagram showing an external compensation circuit connected to a pixel circuit.

Referring to FIGS. 1 and 2, a display device according to an embodiment of the present disclosure includes a display panel 100, a display panel driver for driving the display panel 100, and a power supply unit 220.

The display device of the present disclosure operates in a normal driving mode for displaying an input image on a screen and a sensing mode for sensing electrical properties of pixels.

In the normal driving mode, the display panel driver drives the pixels by writing pixel data to the pixels during an active interval AT every frame period under the control of the timing controller 130. In the sensing mode, the display panel driver may sense the electrical properties of a driving element DT for each sub-pixel at a time set immediately after a power on sequence at which the power of the display device starts to be applied, a vertical blank period VB, and a time set immediately before a power off sequence, and may select a compensation value based on the sensed result to compensate for a variation in the electrical properties of the driving element DT.

The screen of the display panel 100 includes a pixel array AA that displays an input image. The pixel array AA includes a plurality of data lines 102, a plurality of gate lines 104 crossing the data lines 102, and pixels.

The pixels may be arranged on the screen in a matrix form defined by the data lines 102 and the gate lines 104. Other than the matrix form, the pixels may be arranged on the pixel array AA in various forms, such as a form that shares pixels emitting the same color, a stripe form, and a diamond form.

The pixel array includes a pixel column and pixel lines L1 to Ln overlapping the pixel column, n is a natural number. The pixel column includes pixels arranged along a y-axis direction. The pixel line includes pixels arranged along an x-axis direction. One vertical period is one frame period required to write one frame of pixel data to all pixels on the screen. One horizontal period 1H is a scan time required to write pixel data, which is to be written to pixels of one-pixel line sharing the gate line, into the pixels of one-pixel line. One horizontal period is a time obtained by dividing one frame period by the number of m pixel lines L1 to Ln.

Each of the pixels may be divided into a red (R) sub-pixel, a green (G) sub-pixel, and a blue (B) sub-pixel for color reproduction. Each of the pixels may further include a white sub-pixel. Each of sub-pixels 101 includes the same pixel circuit. Hereinafter, "pixel" may be interpreted as a sub-pixel.

In the case of an organic light emitting display device, a pixel circuit may include a light emitting element, a driving element, one or more switch elements, and a capacitor. The light emitting element may be implemented with an OLED.

The current of the OLED may be adjusted according to a gate-source voltage Vgs of the driving element. The driving element and the switch element may be implemented with a transistor. The pixel circuit is connected to the data line 102 and the gate line 104. Each of the sub-pixels 101 includes the pixel circuit.

Touch sensors may be disposed on the display panel 100. A touch input may be sensed using separate touch sensors or may be sensed through pixels. The touch sensors may be arranged on the screen of the display panel in an on-cell type or an add-on type, or may be implemented as in-cell type touch sensors that are incorporated in the pixel array.

The display device may further include a short circuit detection unit 160. The short circuit detection unit 160 detects a short circuit in an EVDD line 105 and an EVSS electrode separated by an insulating layer in the display panel 100. The short circuit detection unit 160 outputs a burnt signal BDP of a specific logic value when the short circuit in the EVDD line 105 and the EVSS electrode are detected. A main power unit of a host system 210 stops outputting a pixel driving voltage EVDD in response to the specific logic value of the burnt signal BDP. Accordingly, when the EVDD line 105 and the EVSS electrode are short-circuited on the display panel 100, since the outputs of the pixel driving voltage EVDD and a low potential power voltage EVSS are cut off, burning of the display panel 100 due to an overcurrent may be prevented. The short circuit detection unit 160 may be mounted on a source printed circuit board (PCB), a control board, or the like.

The display panel driver includes a data driver 110, a gate driver 120, a timing controller 130, a level shifter 140, and the like. The display panel driver may further include a demultiplexer 112 disposed between the data driver 110 and the data lines 102. In addition, the display panel driver may further include a touch sensor driver for driving the touch sensors. The touch sensor driver is omitted in FIG. 1.

The display panel driver writes data of an input image to the pixels of the display panel 100 under the control of the timing controller 130 to display the input image on the screen in the normal driving mode.

The data driver 110 may be implemented with one or more source drive integrated circuits SIC. The data driver 110 includes a digital to analog converter (hereinafter referred to as "DAC") 21 that converts pixel data DATA received from the timing controller 130 into a data voltage, and a sensing unit 111 for sensing the electrical properties of the driving element DT in each of the pixels. The data driver 110 divides a gamma reference voltage inputted from the power supply unit 220 to generate a gamma compensation voltage for each gray level, and supplies the gamma compensation voltage and the pixel data DATA to the DAC 21. The DAC 21 converts the pixel data (digital data) of the input image received from the timing controller 130 into the gamma compensation voltage to output a data voltage Vdata. The data voltage Vdata is applied to the pixels through the data lines 102.

The demultiplexer 112 is disposed between the data driver 110 and the data lines 102. The demultiplexer 112 performs time-division of the data voltage Vdata outputted from each of the channels of the data driver 110 and distributes it to the data lines 102 by using a plurality of switch elements connected between the channels of the data driver 110 and the plurality of data lines. In virtue of the demultiplexer 112, the number of channels of the data driver 110 may be reduced.

The gate driver 120 may be implemented as a gate in panel (GIP) circuit formed directly on a bezel region of the display panel 100 together with a TFT array of the pixel array AA. The gate driver 120 outputs a gate signal to the gate lines 104 under the control of the timing controller 130. The gate driver 120 may shift the gate signal using a shift register to sequentially supply the signal to the gate lines 104. The gate signal may include a scan signal SCAN and a sensing signal SENSE. The gate driver 120 may sequentially output the scan signal SCAN and the sensing signal SENSE using first and second shift registers shown in FIGS. 4A and 4B. The scan signal SCAN and the sensing signal SENS may be synchronized with the data voltage Vdata. The data voltage Vdata may be divided into a data voltage of the input image and a data voltage for sensing. The data voltage of the input image is a grayscale voltage of the pixel data inputted in the normal driving mode. The data voltage for sensing is a predetermined voltage set irrespective of the input image data. The data voltage for sensing is set to a voltage at which the driving element DT can be turned on in the sensing mode. In some embodiments, the data voltage for sensing is a selected voltage set. The data voltage for sensing is set to a voltage at which the driving element DT can be turned on in the sensing mode.

The gate signal SCAN and SENSE may be generated as a pulse swinging between a gate-on voltage VGH and a gate-off voltage VGL. Switch elements M1 and M2 of the pixel circuit are turned on in response to the gate-on voltage VGH of the gate signal SCAN and SENSE, and are turned off in response to the gate-off voltage VGL of the gate signal SCAN and SENSE.

The timing controller 130 includes a compensation unit 131 connected to the external compensation circuit. The compensation unit 131 modulates the pixel data DATA of the input image inputted from a graphic processing unit of the host system 210 based on a sensed result of the electrical properties of the driving element DT to compensate for a variation in the electrical properties of the driving element DT.

The timing controller 130 receives the pixel data DATA of the input image and a timing signal synchronized therewith from the host system. The pixel data DATA is digital data. The timing signal received by the timing controller 130 may include a vertical synchronization signal Vsync, a horizontal synchronization signal Hsync, a data enable signal DE, a clock, and the like. A vertical period timing and a horizontal period timing may be generated by counting the data enable signal DE in the timing controller 130. In this case, the vertical synchronization signal Vsync and the horizontal synchronization signal Hsync may be omitted from the timing signal received by the timing controller 130.

The timing controller 130 may adjust a frame rate to a frequency equal to or higher than an input frame frequency. For example, the timing controller 130 may control the operation timing of the display panel driver 110, 112, and 120 at a frame frequency of a frame frequency×i (i being a natural number) Hz by multiplying the input frame frequency by i. The frame frequency is 60 Hz in a National Television Standards Committee (NTSC) system and 50 Hz in a Phase-Alternating Line (PAL) system.

The timing controller 130 controls the operation timing of the data driver 110, the demultiplexer 112, the gate driver 120, and the level shifter 140 based on the timing signals Vsync, Hsync, and DE received from the host system.

The level shifter 140 outputs a clock in response to a gate timing control signal from the timing controller 130. The clock output from the level shifter 140 includes a start pulse and a shift clock. The clock output from the level shifter 140 swings between the gate-off voltage VGL and the gate-on voltage VGH.

The host system 210 may be any one of a television (TV) system, a set-top box, a navigation system, a personal computer (PC), a home theater system, a mobile device, and a wearable device. The host system 210 includes the main power unit that outputs the pixel driving voltage EVDD.

The power supply unit 220 may receive a DC driving voltage VDD inputted to the host system 210 and output a DC voltage such as a gamma reference voltage GMA, the voltages VGH and VGL of the gate signal, the low potential power voltage EVSS, a reference voltage Vref, and an IC driving voltage Vcc. The gamma reference voltage GMA is supplied to the data driver 110. The low potential power voltage EVSS may be changed to a ground voltage source (GND) in the normal driving mode. The voltages VGH and VGL of the gate signal are supplied to the gate driver 120. The power supply unit 220 may be implemented as a power management integrated circuit (PMIC). The IC driving voltage Vcc is a driving power of the timing controller 130 and the data driver 110.

The external compensation circuit includes, as shown in FIG. 2, a sensing line 103 connected to the pixel circuit, the sensing unit 111, and the compensation unit 131 that receives sensed data ADC DATA from the sensing unit 111.

The DAC and the sensing unit 111 may be integrated in the source drive IC SIC of the data driver 110. The compensation unit 131 may be integrated in the timing controller 130.

The external compensation circuit may apply the reference voltage Vref to the sensing line 103 to initialize a source voltage Vs of the driving element DT, e.g., the voltage of a second node n2, and then may sense the source voltage of the driving element DT to sense the electrical properties Vth and μ of the driving element DT. The reference voltage Vref may be set to a voltage lower than the pixel driving voltage EVDD and equal to or higher than the low potential power voltage EVSS.

In the sensing mode, the sensing unit 111 samples the voltage on the sensing line 103, converts it to digital data through an analog to digital converter (hereinafter referred to as "ADC"), and outputs the sensed data ADC DATA. The sensed data ADC DATA includes electrical properties information such as a threshold voltage Vth and a mobility μ of the driving element DT in each of the pixels.

The compensation unit 131 may compensate the electrical properties of the driving element DT using a look-up table in which compensation values for compensating the threshold voltage Vth and the mobility μ of the driving element DT set in advance for each sub-pixel are set. The compensation unit 131 inputs the sensed data ADC DATA received from the ADC into the look-up table and adds or multiplies the compensation value outputted from the look-up table to the pixel data of the input image to modulate the pixel data, thereby compensating for variations in the electrical properties of the driving element DT.

The pixel data DATA modulated by the compensation unit 131 is transmitted to the source drive IC SIC, converted into the data voltage Vdata by the DAC 21, and applied to the data line 102.

The pixel circuit includes, as shown in FIG. 2, the light emitting element OLED, the driving element DT connected to the light emitting element OLED, the plurality of switch elements M1 and M2, and a capacitor Cst. The driving element DT and the switch elements M1 and M2 may be implemented with an n-channel transistor NMOS.

The light emitting element OLED emits light by a current generated according to the gate-source voltage Vgs of the driving element DT that varies depending on the data voltage Vdata. The light emitting element OLED may be implemented with an OLED including an organic compound layer formed between an anode and a cathode. The organic compound layer may include, but is not limited to, a hole injection layer HIL, a hole transport layer HTL, an emission layer EML, an electron transport layer ETL, an electron injection layer EIL, and the like. The anode of the light emitting element OLED is connected to the driving element DT through the second node n2, and the cathode of the light emitting element OLED is connected to the EVSS electrode to which the low potential power voltage EVSS is applied. In FIG. 2, "Coled" is the capacity of the OLED.

The first switch element M1 is turned on in response to the scan signal SCAN to connect the data line 102 to a first node n1 and supply the data voltage Vdata to the gate of the driving element DT connected to the first node n1. The gate voltage of the driving element DT is the same as the voltage of the first node n1. The first switch element M1 includes a gate connected to a first gate line 1041 to which a first scan signal SCAN is applied, a first electrode connected to the data line 102, and a second electrode connected to the first node n1.

The second switch element M2 is turned on in response to the sensing signal SENSE to supply the reference voltage Vref to the second node n2. The second switch element M2 includes a gate connected to the second gate line 1042 to which the sensing signal SENSE is applied, a first electrode connected to the sensing line 103 to which the reference voltage Vref is applied, and a second electrode connected to the second node n2.

In the sensing mode, the second switch element M2 is turned on to connect the second node n2 to the sensing line 103. Accordingly, in the sensing mode, the source voltage of the driving element DT is the reference voltage Vref.

The driving element DT supplies a current to the light emitting element OLED according to the gate-source voltage Vgs. The driving element DT includes a gate connected to the first node n1, a first electrode (or drain) connected to the EVDD line 105 through which the pixel driving voltage EVDD is supplied, and a second electrode (or source) connected to the anode of the OLED through the second node n2. The pixel driving voltage EVDD is supplied to all pixels through the EVDD line 105.

The capacitor Cst is connected between the first node n1 and the second node n2. The capacitor Cst charges the gate-source voltage Vgs of the driving element DT.

The sensing mode may be divided into a mode before product shipment and a mode after product shipment. Before product shipment, the electrical properties Vth and μ of the driving element DT are sensed in each of the sub-pixels through the external compensation circuit connected to the pixels, and based on the sensed result, deviation in the electrical properties Vth and μ of the driving element DT are compensated for each sub-pixel. In the sensing mode before product shipment, the electrical properties Vth and μ of the driving element DT sensed for each sub-pixel are set in the look-up table.

The sensing mode after product shipment may be divided into an ON RF mode performed in the power on sequence, an RT mode performed in the vertical blank period VB of a frame period during the display driving period, and an OFF RS mode performed in the power off sequence.

In the ON RF mode, the mobility μ of the driving element is sensed for each pixel in the power on sequence at which the display device is powered on and starts to be driven, and a mobility compensation value of the driving element measured for each sub-pixel before product shipment is updated based on the sensed result of the mobility.

In the RT mode, the mobility μ of the driving element DT is sensed in real time in the vertical blank period VB every frame period during the display driving period in which an image is displayed, and the mobility compensation value is updated for each sub-pixel based on the sensed result of the mobility. The vertical blank period VB is allocated between the active interval AT of a $(N-1)^{th}$ frame period and the active interval AT of a $N^{th}$ frame period.

In the OFF RS mode, when the display device is powered off, a threshold voltage Vth of the driving element is sensed in each of the pixels, and a threshold voltage compensation value is updated for each sub-pixel based on the sensed result of the threshold voltage. In the OFF RS mode, the display panel driver and the external compensation circuit are driven for a preset delay time before the power is completely turned off to sense the threshold voltage Vth of the driving element in each of the sub-pixels and update the threshold voltage compensation value for each sub-pixel.

Figure 3:
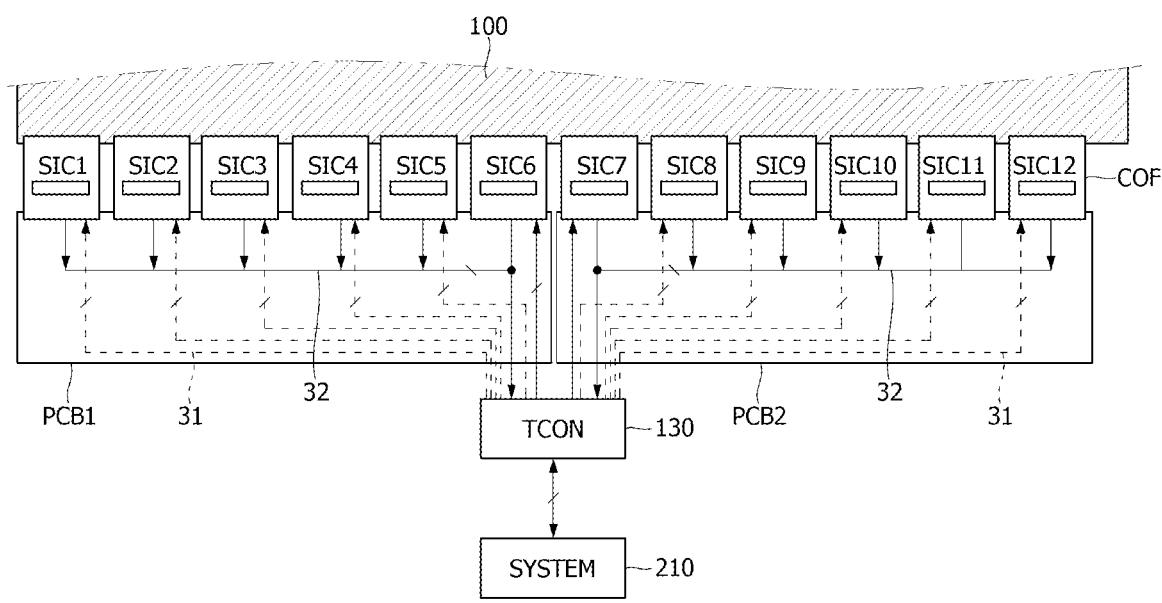
FIG. 3 is a diagram showing wire connection between a timing controller and source drive ICs in a display device according to an embodiment of the present disclosure.

FIG. 3 is a diagram illustrating wire connections between a timing controller and source drive ICs in a display device according to an embodiment of the present disclosure. In FIG. 3, "TCON" refers to the timing controller 130 and "SYSTEM" refers to the host system 210.

Referring to FIG. 3, the timing controller 130 may transmit data together with a clock to each of the source drive ICs SIC1 to SIC12 through an EPI line 31. The clock and data generated from the timing controller 130 may be converted into a differential signal encoded in a data format defined in an Embedded Clock Point to Point Interface (EPI) interface protocol, and may be transmitted serially to the source drive ICs SIC1 to SIC12. In the EPI interface, each of the source drive ICs SIC1 to SIC12 multiplies a clock inputted from the timing controller 130 to recover the clock, thereby generating an internal clock for sampling data. The timing controller 130 transmits a preamble clock or a clock training pattern signal to the source drive ICs SIC1 to SIC12 so that the phase of the recovered clock can be locked in the data driver 110.

Each of the source drive ICs SIC1 to SIC12 may be mounted on a chip on film (COF). The COFs connect source PCBs PCB1 and PCB2 to the display panel 100. A clock recovery circuit for clock and data recovery (CDR) is incorporated in each of the source drive ICs SIC1 to SIC12. The clock recovery circuit may be implemented with either a phase locked loop (PLL) or a delayed-locked loop (DLL). The clock recovery circuit recovers a clock signal to generate an internal clock, and locks the phase and frequency of the internal clock according to the clock training pattern signal. After the phase and frequency of the internal clock are stably locked, a data link capable of stabilizing signal transmission is established between the timing controller 130 and the source drive ICs SIC1 to SIC12. After the data link is established between the timing controller 130 and the source drive ICs SIC1 to SIC12, the timing controller 130 starts to transmit control data and pixel data to the source drive ICs SIC1 to SIC12.

An ADC data line 32 may connect the timing controller 130 to the plurality of source drive ICs SIC1 to SIC12 in parallel. The source drive ICs SIC1 to SIC12 may convert the sensed data ADC DATA outputted from the ADC of the sensing unit 111 into a parallel low voltage differential signaling (LVDS) signal and transmit it to the timing controller 130. In FIG. 3, two ADC data lines 32 are connected to the timing controller 130, but the present disclosure is not limited thereto. For example, the source drive ICs SIC1 to SIC12 may transmit the sensed data to the timing controller 130 through four ADC data lines 32.

Figure 4A:
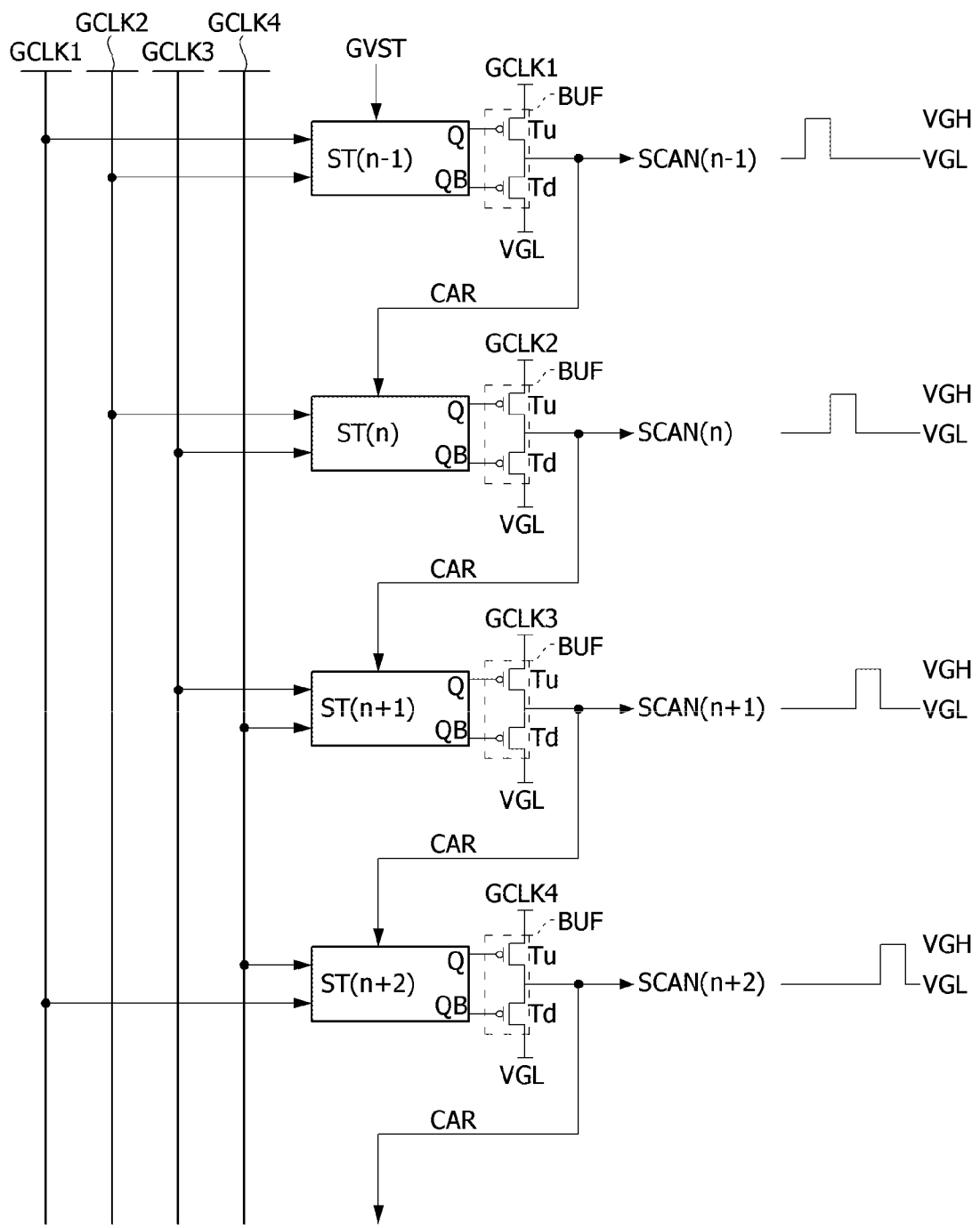
FIGS. 4A and 4B are block diagrams showing a shift register of a gate driver.
Figure 4B:
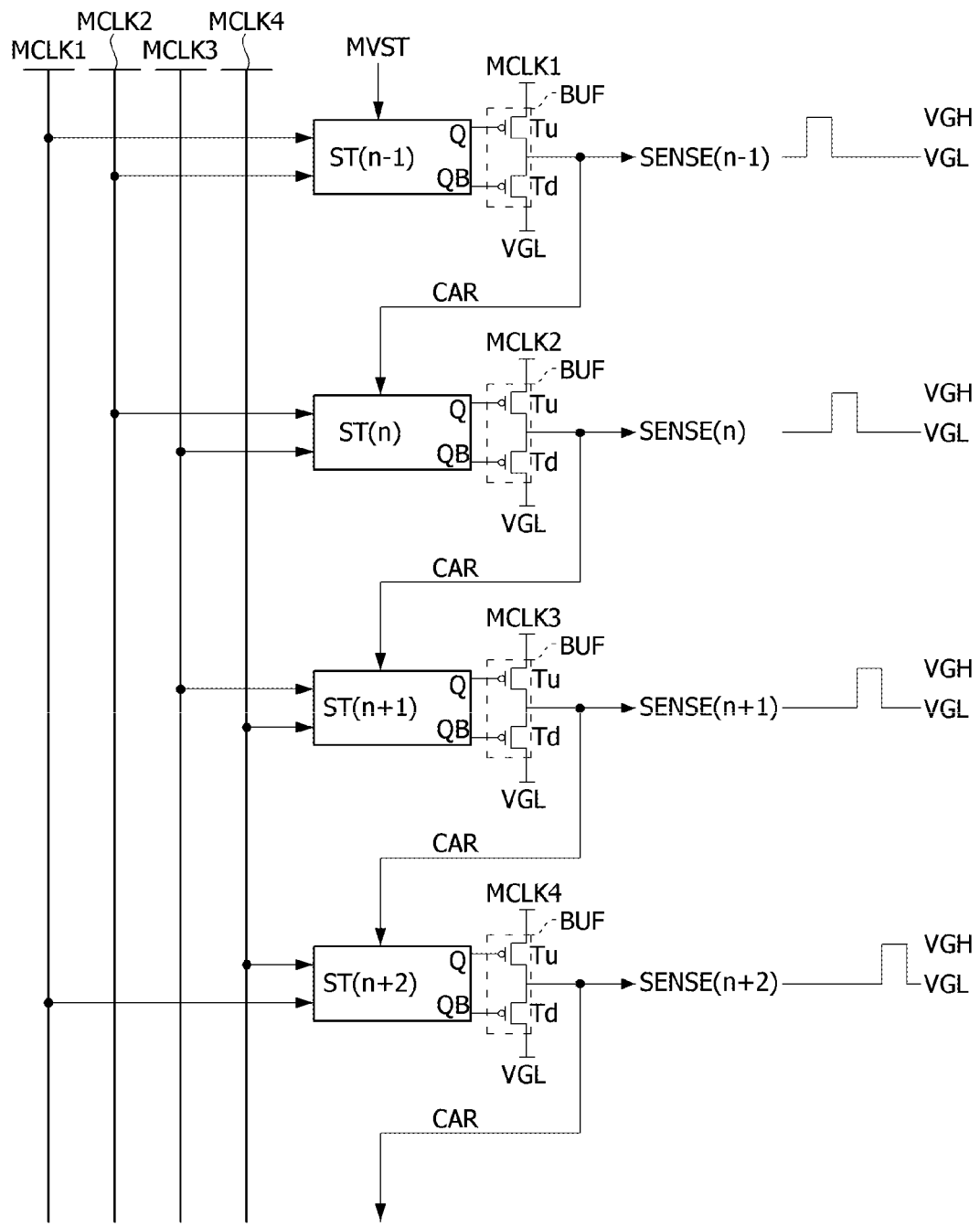

FIGS. 4A and 4B are block diagrams illustrating a shift register of the gate driver 120. FIG. 4A shows a first shift register SR1 that outputs the scan signal SCAN. FIG. 4B shows a second shift register SR2 that outputs the sensing signal SENSE.

Referring to FIG. 4A, the first shift register SR1 includes signal transmission units ST(n−1) to ST(n+2) that are dependently connected. Each of the signal transmission units ST(n−1) to ST(n+2) includes a VST node through which a start pulse GVST is inputted, a CLK node through which a shift clock GCLK1 to GCLK4 is inputted, and an output node through which the pulse of a scan signal SCAN(n−1) to SCAN(n+2) is outputted. The start pulse GVST is generally inputted to a first signal transmission unit. In FIG. 4A, an $(n-1)^{th}$ signal transmission unit ST(n−1) may be the first signal transmission unit. The shift clocks GCLK1 to GCLK4 may be 4-phase clocks, but are not limited thereto.

The timing controller 130 may generate a first gate timing control signal. The level shifter 140 outputs the clocks GVST and GCLK1 to 4 in response to the first gate timing control signal.

The signal transmission units ST(n) to ST(n+2) dependently connected to the $(n-1)^{th}$ signal transmission unit ST(n−1) receive a carry signal CAR from the previous signal transmission unit and starts to be driven. The carry signal CAR may be a pulse of the scan signal SCAN(n−1) to SCAN(n+2) outputted from the previous signal transmission unit. Each of the signal transmission units ST(n−1) to ST(n+2) may output the carry signal CAR through a separate carry signal output node. The carry signal CAR is outputted simultaneously with the pulse of the scan signal SCAN(n−1) to SCAN(n+2) outputted from the previous signal transmission unit.

Each of the signal transmission units ST(n−1) to ST(n+2) includes a first control node Q, a second control node QB, and a buffer BUF. The buffer BUF outputs the gate signal to the gate line 1041 through the output node using a pull-up transistor Tu and a pull-down transistor Td.

When the shift clock is inputted in a state where the first control node Q is charged, the buffer BUF supplies the voltage of the shift clock to the output node to rise the pulse of the scan signal SCAN(n−1) to SCAN(n+2), and when the second control node QB is charged, the buffer BUF discharges the output node to fall the pulse of the scan signal SCAN(n−1) to SCAN(n+2). Therefore, the signal transmission units ST(n−1) to ST(n+2) sequentially output the pulses of the scan signals SCAN(n−1) to SCAN(n+2) in response to the shift clocks GCLK1 to GCLK4.

When the voltage of the first control node Q is charged and the shift clock GCLK1 to GCLK4 is inputted, the pull-up transistor Tu is turned on to charge the voltage of the output node up to the gate-on voltage VGH. At this time, the pulses of the scan signal SCAN(n−1) to SCAN(n+2) and the carry signal CAR rise up to the gate-on voltage VGH. When the voltage of the shift clock GCLK1 to GCLK4 rises to the gate-on voltage VGH, the voltage of the first control node Q is bootstrapped to be boosted to a voltage higher than the gate-on voltage VGH. When the voltage of the first control node Q becomes higher than the threshold voltage of the pull-up transistor, the pull-up transistor Tu is turned on to charge the output node.

The voltage of the second control node QB is discharged to the gate-off voltage VGL when the first control node Q is charged to a voltage equal to or higher than the gate-on voltage VGH. When the voltage of the second control node QB is charged to the gate-on voltage VGH, the pull-down transistor Td is turned on to supply the gate-off voltage VGL to the output node and discharge the gate line 1041. At this time, the pulses of the scan signal SCAN(n−1) to SCAN(n+2) and the carry signal CAR are lowered to the gate-off voltage VGL.

Referring to FIG. 4B, the second shift register SR2 includes signal transmission units ST(n−1) to ST(n+2) that are dependently connected. Each of the signal transmission units ST(n−1) to ST(n+2) includes a VST node through which a start pulse MVST is inputted, a CLK node through which a shift clock MCLK1 to MCLK4 is inputted, and an output node through which the pulse of a sensing signal SENSE(n−1) to SENSE(n+2) is outputted. The start pulse MVST is generally inputted to a first signal transmission unit. In FIG. 4B, an $(n-1)^{th}$ signal transmission unit ST(n−1) may be the first signal transmission unit. The shift clocks MCLK1 to MCLK4 may be 4-phase clocks, but are not limited thereto.

The timing controller 130 may generate a second gate timing control signal. The level shifter 140 outputs the clocks MVST and MCLK1 to MCLK4 in response to the second gate timing control signal.

The signal transmission units ST(n) to ST(n+2) dependently connected to the $(n-1)^{th}$ signal transmission unit ST(n−1) receive a carry signal CAR from the previous signal transmission unit and starts to be driven. The carry signal CAR may be a pulse of the sensing signal SENSE(n−1) to SENSE(n+2) outputted from the previous signal transmission unit. Each of the signal transmission units ST(n−1) to ST(n+2) may output the carry signal CAR through a separate carry signal output node. The carry signal CAR is outputted simultaneously with the pulse of the sensing signal SENSE(n−1) to SENSE (n+2) outputted from the previous signal transmission unit.

Each of the signal transmission units ST(n−1) to ST(n+2) includes a first control node Q, a second control node QB, and a buffer BUF.

The buffer BUF outputs the gate signal to the gate line 1042 through the output node using a pull-up transistor Tu and a pull-down transistor Td. When the shift clock is inputted in a state where the first control node Q is charged, the buffer BUF supplies the voltage of the shift clock to the output node to rise the pulse of the sensing signal SENSE (n−1) to SENSE(n+2), and when the second control node QB is charged, the buffer BUF discharges the output node to fall the pulse of the sensing signal SENSE(n−1) to SENSE (n+2). Therefore, the signal transmission units ST(n−1) to ST(n+2) sequentially output the pulses of the sensing signals SENSE(n−1) to SENSE(n+2) in response to the shift clocks MCLK1 to MCLK4.

When the voltage of the first control node Q is charged and the shift clock MCLK1 to MCLK4 is inputted, the pull-up transistor Tu is turned on to charge the voltage of the output node up to the gate-on voltage VGH. At this time, the pulses of the sensing signal SENSE(n−1) to SENSE(n+2) and the carry signal CAR rise up to the gate-on voltage VGH. When the voltage of the shift clock MCLK1 to MCLK4 rises to the gate-on voltage VGH, the voltage of the first control node Q is bootstrapped to be boosted to a voltage higher than the gate-on voltage VGH. When the voltage of the first control node Q becomes higher than the threshold voltage of the pull-up transistor, the pull-up transistor Tu is turned on to charge the output node.

The voltage of the second control node QB is discharged to the gate-off voltage VGL when the first control node Q is charged to a voltage equal to or higher than the gate-on voltage VGH. When the voltage of the second control node QB is charged to the gate-on voltage VGH, the pull-down transistor Td is turned on to supply the gate-off voltage VGL to the output node and discharge the gate line 1042. At this time, the pulses of the sensing signal SENSE(n−1) to SENSE(n+2) and the carry signal CAR are lowered to the gate-off voltage VGL.

Figure 5A:
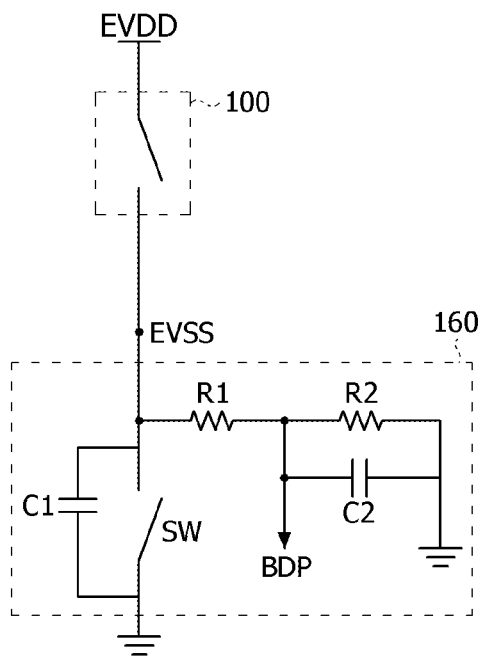
FIGS. 5A and 5B are circuit diagrams showing a short circuit detection unit in detail.
Figure 5B:
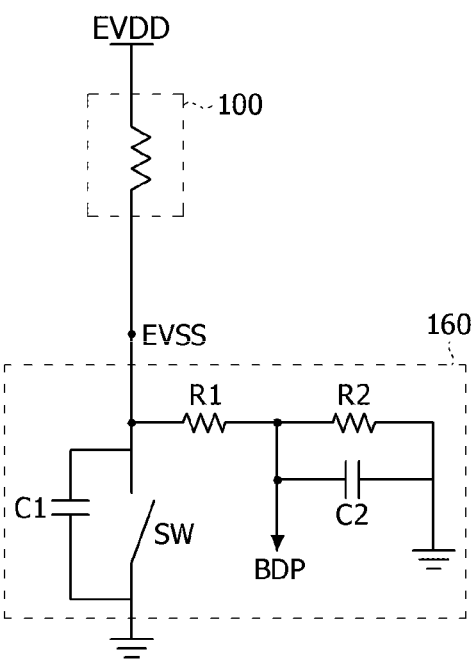

FIGS. 5A and 5B are circuit diagrams showing the short circuit detection unit 160 in detail. FIG. 5A is an equivalent circuit diagram showing a state in which the pixel driving voltage EVDD and the low potential power voltage EVSS are not short-circuited while the pixels of the display panel are not driven. FIG. 5B is an equivalent circuit diagram showing a state in which the pixel driving voltage EVDD and the low potential power voltage EVSS are short-circuited while the pixels of the display panel are not driven.

Referring to FIGS. 5A and 5B, the short circuit detection unit 160 includes a switch element SW, resistors R1 and R2, and capacitors C1 and C2. The switch element SW may be implemented with a MOSFET including a first electrode connected to the EVSS electrode and a second electrode connected to the ground voltage source (GND). When a gate electrode is floating or the gate-off voltage is applied, the switch element SW is maintained in an off state. The capacitor C1 is connected between the first electrode and the second electrode of the switch element SW.

The resistors R1 and R2 are connected in series between the EVSS electrode and the ground voltage source (GND), and the capacitor C2 is connected in parallel to the second resistor R2.

As shown in FIG. 5A, when the pixel driving voltage EVDD and the low potential power voltage EVSS are not short-circuited in the display panel 100, the voltage of the burnt signal BDP outputted from the short circuit detection unit 160 is equal to the low potential power voltage EVSS. On the other hand, as shown in FIG. 5B, when the pixel driving voltage EVDD and the low potential power voltage EVSS are short-circuited in the display panel 100, the burnt signal BDP is changed to a signal of a specific level to block the output of the main power unit of the host system 210. In this case, since the pixel driving voltage EVDD is not applied to the pixels of the display panel 100, all the pixels are turned off and no overcurrent occurs in the display panel 100. In another embodiment, when the burnt signal BDP of a specific level is detected, the power of the data driver 110 may also be cut off.

Figure 6:
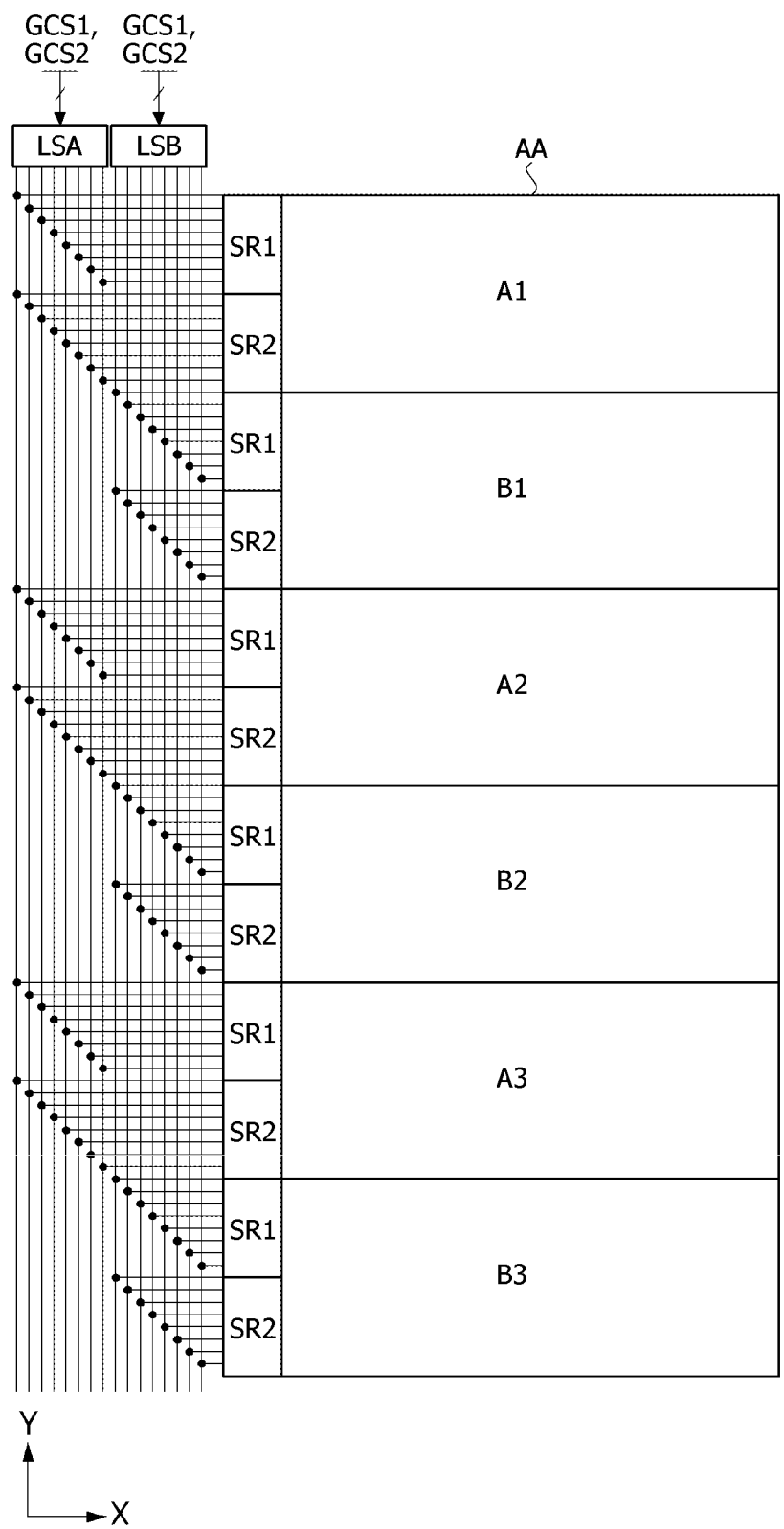
FIG. 6 is a diagram showing an example of a pixel array that is dividedly driven by first and second level shifters.

FIG. 6 is a diagram showing an example of a pixel array which is dividedly driven by first and second level shifters.

The level shifter 140 may include, as shown in FIG. 6, first and second level shifters LSA and LSB. The pixel array AA may be divided and driven into at least a first group and a second group. The first and second groups are pixel regions divided by the level shifters LSA and LSB.

In the example of FIG. 6, in each of the blocks, the first level shifter LSA receives the first and second gate timing control signals GCS1 and GSC2 and outputs the clocks GCLK, MCLK, GVST, and MVST to the first and second shift registers SR1 and SR2 connected to the first blocks A1 to A3. In each of the blocks, the second level shifter LSB receives the first and second gate timing control signals GSC1 and GSC2 and outputs the clocks GCLK, MCLK, GVST, and MVST to the first and second shift registers SR1 and SR2 connected to the second blocks B1 to B3. GCLK and MCLK are shift clocks. GVST and MVST are start pulses.

The first shift register SR1 outputs the scan signal in response to the clock GCLK, MCLK, GVST, and MVST output from the first level shifter LSA or the second level shifter LSB. The second shift register SR2 outputs the sensing signal in response to the clock GCLK, MCLK, GVST, and MVST output from the first level shifter LSA or the second level shifter LSB.

A first group of pixels may be divided into a plurality of first blocks of pixels A1 to A3. A second group of pixels may be divided into a plurality of second blocks of pixels B1 to B3. The first blocks A1 to A3 may alternate with the second blocks B1 to B3 at one block intervals in a vertical or column direction y of the display panel 100. For example, a second-first block B1 is disposed between a first-first block A1 and a first-second block A2, and a first-third block A3 is disposed between a second-second block B2 and a second-third block B3.

Each of the first blocks A1 to A3 includes gate lines connected to the first and second shift registers SR1 and SR2. The first level shifter LSA applies the clocks GCLK, MCLK, GVST, and MVST to the first and second shift registers SR1 and SR2 connected to the gate lines of the first blocks A1 to A3 to allow the gate signal SCAN and SENSE to be outputted from the first and second shift registers SR1 and SR2.

When the clocks GCLK, MCLK, GVST, and MVST are output from the first level shifter LSA in the normal driving mode, the first and second shift registers SR1 and SR2 connected to the gate lines of the first blocks A1 to A3 output the gate signal SCAN and SENSE synchronized with the data voltage Vdata of the pixel data on the first blocks A1 to A3. In the normal driving mode, the pixel data is written to the pixels of the first blocks A1 to A3. In the sensing mode, the sensed data ADC DATA including the electrical properties information of the driving element sensed from the pixels of the first blocks A1 to A3 is transmitted to the timing controller 130.

When the clocks GCLK, MCLK, GVST, and MVST are output from the second level shifter LSB in the normal driving mode, the first and second shift registers SR1 and SR2 connected to the gate lines of the second blocks B1 to B3 output the gate signal SCAN and SENSE synchronized with the data voltage Vdata of the pixel data. In the normal driving mode, the pixel data is written to the pixels of the second blocks B1 to B3. In the sensing mode, the sensed data ADC DATA including the electrical properties information of the driving element sensed from the pixels of the second blocks B1 to B3 is transmitted to the timing controller 130.

Figure 7:
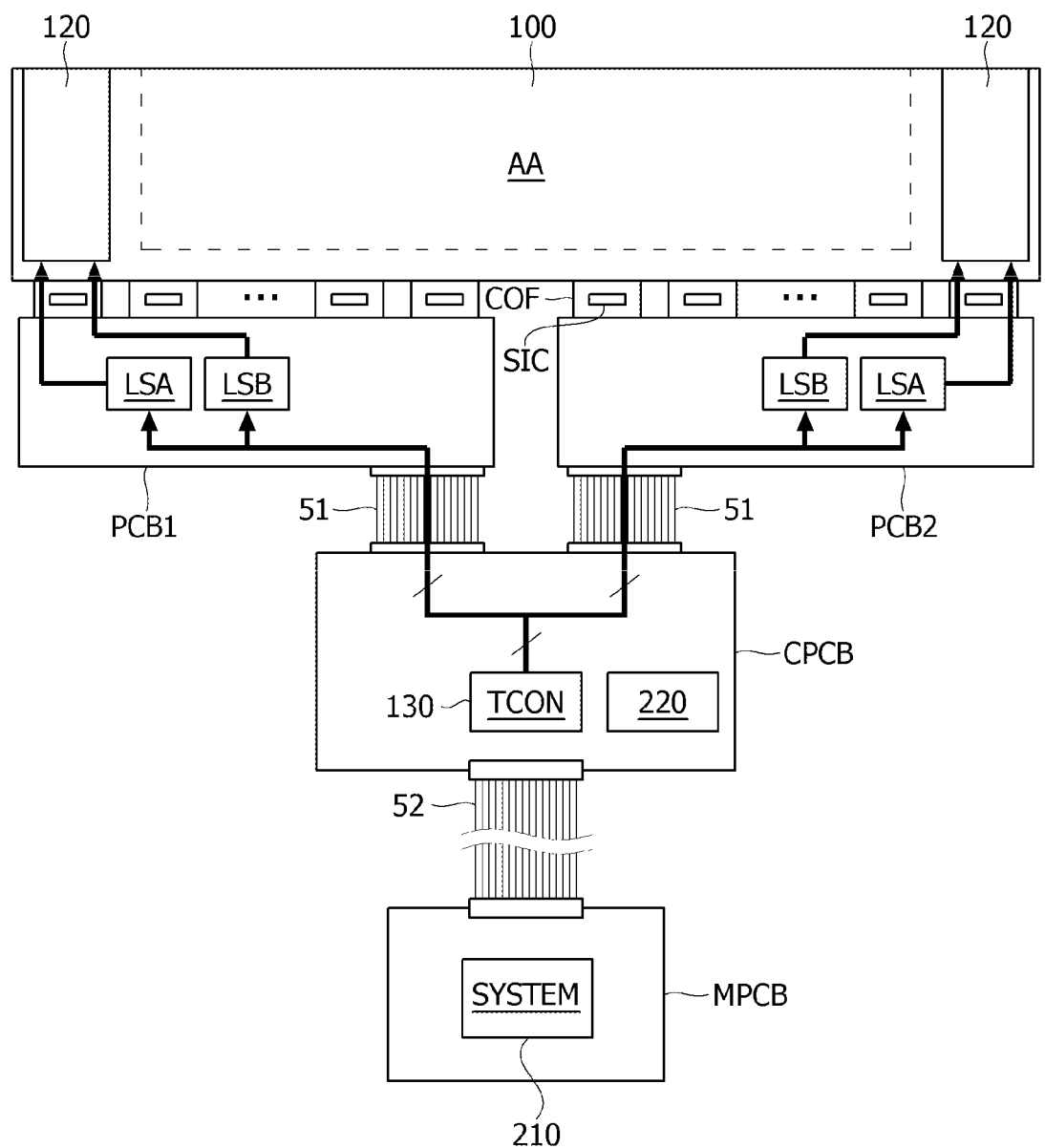
FIGS. 7 and 8 are diagrams showing an example of a display panel, a source PCB, a control board, and a system board in a display device according to an embodiment of the present disclosure.
Figure 8:
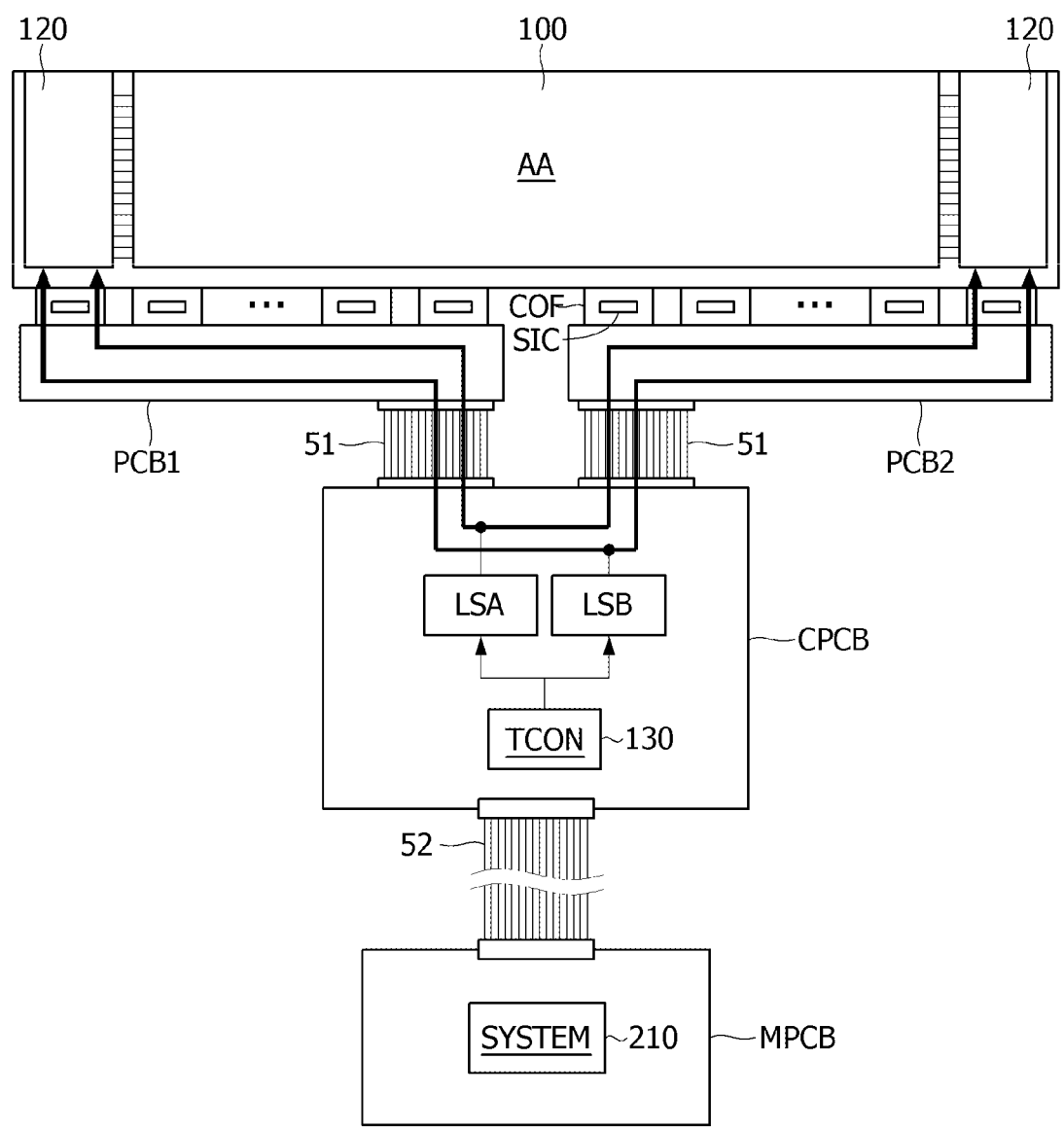

FIGS. 7 and 8 are diagrams illustrating an example of a display panel, a source PCB, a control board, and a system board in a display device according to an embodiment of the present disclosure.

Referring to FIG. 7, a control board CPCB may be connected to the first and second source PCBs PCB1 and PCB2 through a flexible cable 51 and a connector. The flexible cable 51 may be implemented with, for example, a flexible flat cable (FFC). The timing controller 130 and the power supply unit 220 may be mounted on the control board CPCB.

The display panel 100 includes the pixel array AA that is divided and driven into the first blocks A1 to A3 and the second blocks B1 to B3, and the gate driver 120 that drives the gate lines of the pixel array AA using the first and second shift registers SR1 and SR2.

The control board CPCB may be connected to a system board MPCB through a flexible cable 52 and a connector. Circuit elements of the host system 210 may be mounted on the system board MPCB.

The first and second level shifters LSA and LSB may be mounted on each of the source PCBs PCB1 and PCB2. Accordingly, the first and second gate timing control signals generated from the timing controller 130 are transmitted to the first and second level shifters LSA and LSB through the flexible cable 51 and the source PCBs PCB1 and PCB2. The first level shifter LSA applies the first and second gate timing control signals to the first and second shift registers SR1 and SR2 connected to the gate lines of the first blocks A1 to A3 of the pixel array AA. The second level shifter LSB applies the first and second gate timing control signals to the first and second shift registers SR1 and SR2 connected to the gate lines of the second blocks B1 to B3.

Meanwhile, as shown in FIG. 8, the first and second level shifters LSA and LSB may be mounted on the control board CPCB.

The display device according to an embodiment of the present disclosure may control the gate driver 120 using the plurality of level shifters LSA and LSB as described above. In this case, in the present disclosure, when the level shifters are not synchronized in the sensing mode, the timing controller 130 may be reset to quickly recover an image displayed on the display panel.

The timing controller 130 may be reset by predicting a situation in which image quality is deteriorated, such as horizontal band-shaped noises appearing at equal intervals on the screen, based on the comparison of the sensed data ADC DATA in the sensing mode. For example, the timing controller 130 may be reset by determining that the level shifters are out of sync with each other to cause horizontal band-shaped noises on the screen, based on a result of comparing the sensed data ADC DATA in the sensing mode.

The display device according to an embodiment of the present disclosure may, when a situation where the level shifters are not synchronized is continued or repeated for a predetermined or selected time or over in the sensing mode, block the output of the main power unit of the host system 210 to prevent the burning of the display panel 100.

When the pixel driving voltage EVDD and the low potential power voltage EVSS are short-circuited in the display panel 100, if the timing controller 130 is reset, an overcurrent may be applied to the display panel 100 to accelerate the burning of the display panel 100. Accordingly, in the present disclosure, when the burnt signal BDP of a specific level is generated from the short circuit detection unit 160, the output of the main power unit of the host system 210 is cut off and the timing controller 130 is not reset.

Figure 9:
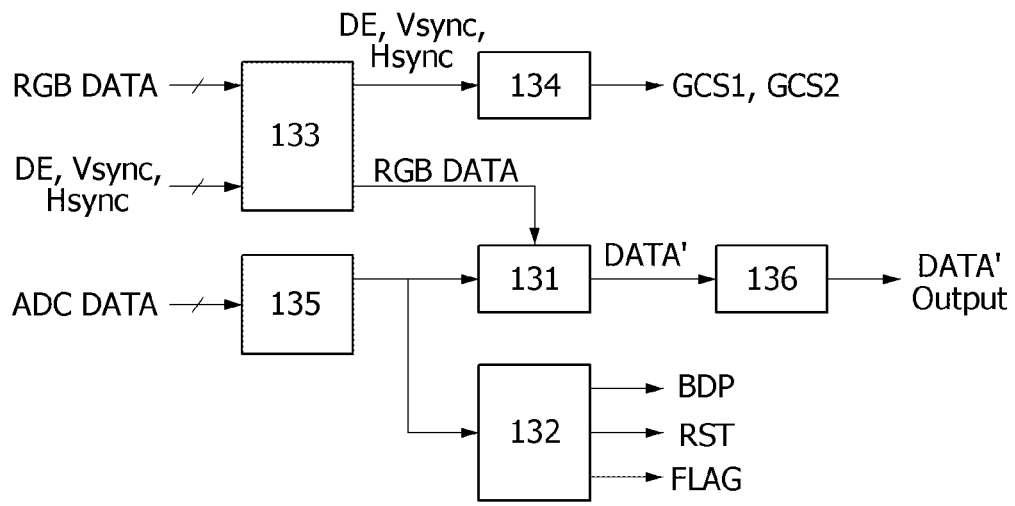
FIG. 9 is a block diagram showing a timing controller according to an embodiment of the present disclosure.

FIG. 9 is a block diagram showing a timing controller according to an embodiment of the present disclosure.

Referring to FIG. 9, the timing controller 130 includes a pixel data receiving unit 133, a sensed data receiving unit 135, the compensation unit 131, a sensing error processing unit 132, a data transmitting unit 136, and a gate control unit 134.

The pixel data receiving unit 133 receives pixel data RGB DATA of an input image from the host system 210 and the timing signal DE, Vsync, and Hsync synchronized with the data RGB DATA. The pixel data receiving unit 133 may receive the pixel data RGB DATA and the timing signal DE, Vsync, and Hsync through a standard interface, e.g., an embedded display port (eDP). The pixel data receiving unit 133 supplies the pixel data RGB DATA of the input image received from the host system 210 to the compensation unit 131 and transmits the timing signal to the gate control unit 134.

The gate control unit 134 may count the timing signal DE, Vsync, and Hsync to generate the first and second gate timing control signals GCS1 and GCS2 as preset gate timing control values.

The sensed data receiving unit 135 receives the sensed data from the ADC of the sensing unit 111 through a parallel low voltage differential signaling (LVDS) interface and transmits the sensed data to the compensation unit 131 and the sensing error processing unit 132, in the sensing mode.

The compensation unit 131 updates the compensation value with the received sensed data, and compensates the electrical properties of the driving element DT by adding or multiplying the compensation value to the pixel data, in the sensing mode. Pixel data DATA' modulated by the compensation unit 131 is transmitted to the data driver 110 through the data transmitting unit 136.

The sensing error processing unit 132 detects a sensing error by analyzing the sensed data. As an example, the sensing error processing unit 132 adds the sensed data in each of the neighboring blocks of the first and second groups, and calculates an average of the sum. Hereinafter, a sensed data average value calculated in one block is referred to as "block sensed data average value." The sensing error processing unit 132 calculates a difference in the block sensed data average values between the neighboring blocks, and when the difference is greater than a first threshold value set in advance, determines the blocks as sensing error blocks. When a sensing error block is detected, the sensing error processing unit 132 may temporarily interrupt the IC driving voltage Vcc of the timing controller 130 and then apply it again to the timing controller 130 to reset the timing controller 130, thereby recovering the screen while preventing image quality defects from appearing on the screen, or may output the burnt signal BDP of a specific level to block the output of the main power unit of the host system 210. The sensing error processing unit 132 may apply the reset signal RST to the power supply unit 220 to cut off the IC driving voltage Vcc.

In another embodiment, the sensing error processing unit 132 may determine whether the number of the sensing error blocks, in which the difference between the block sensed data average values between the neighboring blocks with respect to the entire pixel array AA of the screen is greater than the first threshold value, is greater than a second threshold value set in advance. In addition, the sensing error processing unit 132 may compare the block sensed data average values obtained from the neighboring blocks, and then, when the number of the sensing error blocks is greater than a predetermined number (or a selected number), may reset the timing controller 130 by outputting the reset signal RST or output the burnt signal BDP of a specific level. Here, in one embodiment, the predetermined number is defined as the second threshold value.

In the sensing mode, e.g., the ON RF mode, if the first and second level shifters LSA and LSB are not synchronized, the sensed data of one-pixel line may be lost at a boundary between the neighboring blocks, or the sensed data of the pixel line may be shifted on a line basis. As a result, since the sensed data is not matched for each pixel, the pixel data is modulated to an incorrect sensing value, resulting in the image quality defects in which horizontal band-shaped luminance unevenness appears on the screen.

In the ON RF mode in which the display device is powered on and starts to be driven, the level shifters LSA and LSB may be temporarily out of sync. At this time, if the synchronization between the level shifters LSA and LSB is not quickly recovered, horizontal band-shaped noise may be seen on the screen. The sensing error processing unit 132 may reset the timing controller 130 or output the burnt signal BDP of a specific level by determining a sensing error based on a result of comparing the sensed data between the blocks in the ON RF mode. In most cases, when the timing controller 130 is reset, the synchronization between the level shifters LSA and LSB may be recovered, so that normal sensed data may be obtained. Meanwhile, when a sensing error is detected between the blocks in not only the ON RF mode but also in other sensing modes, the sensing error processing unit 132 may reset the timing controller 130 or output the burnt signal BDP of a specific level.

The data transmitting unit 136 transmits the data DATA' from the compensation unit 131 to the data driver 110 through a data transmission method conforming to a protocol of an interface, e.g., EPI interface, for data communication between the timing controller 130 and the data driver 110. The data driver 110 inputs the pixel data received through the EPI interface to the DAC, converts the pixel data into the data voltage Vdata, and outputs it.

The operation of the sensing error processing unit 132 will be described in detail with reference to FIGS. 10 and 11.

Figure 10:
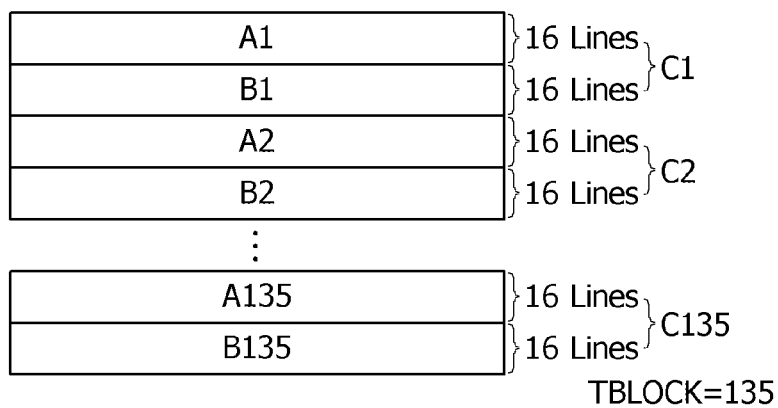
FIG. 10 is a diagram schematically showing an example in which first blocks and second blocks are divided by 16 pixel lines in a display device having a UHD resolution.

FIG. 10 is a diagram schematically illustrating an example in which first blocks and second blocks are divided by 16 pixel lines in a display device having an ultra-high-definition (UHD) resolution.

Referring to FIG. 10, in a display device having a UHD resolution, each of the blocks in the first and second groups may be divided into 16 pixel lines. A total of 135 differences (TBLOCK=135) of the block sensed data average values, which are calculated as absolute values between the first block and the second block that are neighboring on the entire screen, may be obtained.

When "AiAVERAGE" is an average of the block sensed data of a first-$i^{th}$ (i being a natural number) block belonging to the first group, and "BiAVERAGE" is an average of the block sensed data of a second-$i^{th}$ block belonging to the second group, a difference Ci of the block sensed data average value between neighboring blocks may be expressed as follows.

$$C1=|A1\text{AVERAGE}-B1\text{AVERAGE}|$$

$$C2=|A2\text{AVERAGE}-B2\text{AVERAGE}|$$

$$C134=|A134\text{AVERAGE}-B134\text{AVERAGE}|$$

$$C135=|A135\text{AVERAGE}-B135\text{AVERAGE}|$$

Figure 11:
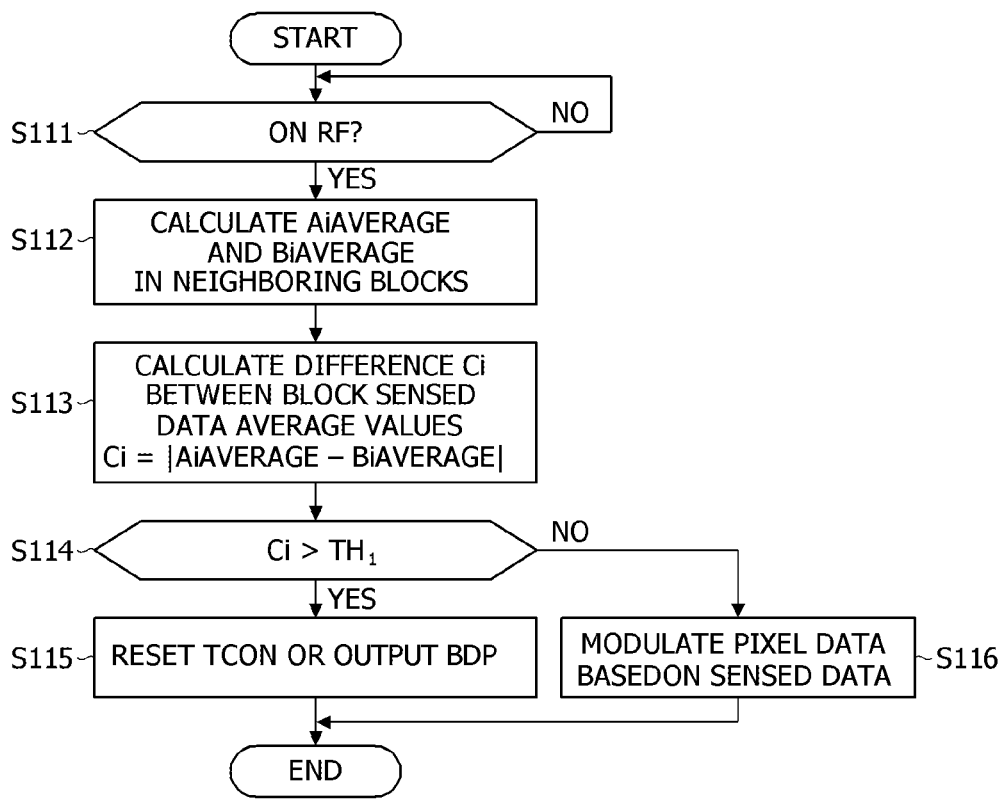
FIG. 11 is a flowchart illustrating a sensing error processing according to an embodiment of the present disclosure.

FIG. 11 is a flowchart illustrating a sensing error processing according to an embodiment of the present disclosure.

Referring to FIG. 11, in the sensing mode, the sensing error processing unit 132 sums the sensed data received for each pixel on a block basis and divides the result by the number of pixels of a corresponding block to calculate the block sensed data average value (steps S111 and S112). The sensing mode may be the ON RF mode. The sensing error processing unit 132 calculates an absolute value of the difference Ci of the block sensed data average values between one block of the first group and one block of the second group that are neighboring (step S113).

When the difference Ci of the block sensed data average values calculated between the neighboring blocks is greater than a predetermined first threshold value $TH_1$, the sensing error processing unit 132 detects a sensing error block in which the pixel and the sensed data are mismatched due to a synchronization problem between the level shifters LSA and LSB (step S114). The first threshold value $TH_1$ may be set based on an experimental result confirming the verification of the sensed data between the blocks.

When a sensing error block is detected, the sensing error processing unit 132 may generate a flag FLAG indicating that the level shifters are out of sync. In response to the flag FLAG from the sensing error processing unit 132, the gate control unit 134 of the timing controller 130 synchronizes the first and second gate timing control signals GCS1 and GCS2, and transmits them again to the first and second level shifters LSA and LSB. In addition, when a sensing error block is detected, the sensing error processing unit 132 may reset the timing controller 130 or output the burnt signal BDP of a specific level (step S115).

When the sensing error block is not detected, the compensation unit 131 modulates the pixel data based on the sensed data received from the sensing unit 111 and transmits it to the data driver 110 (step S116).

Figure 12:
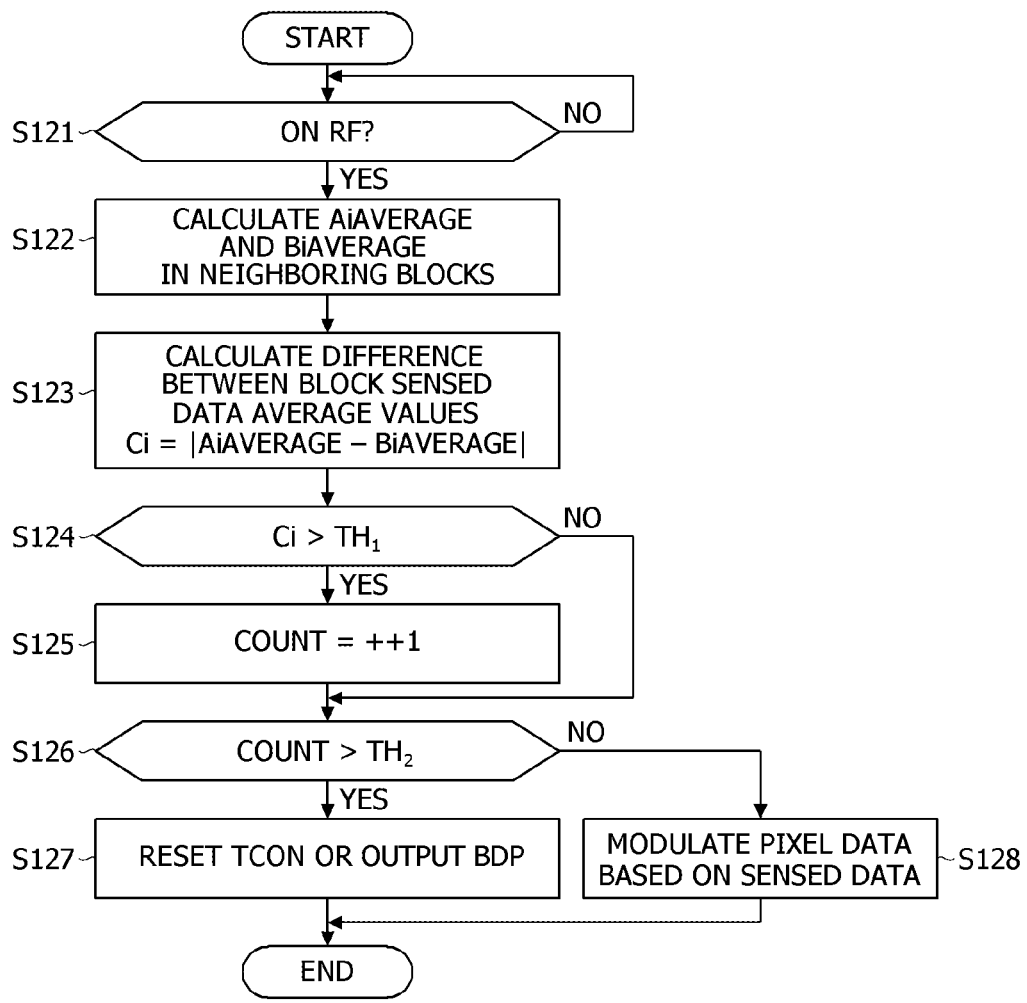
FIG. 12 is a flowchart illustrating a sensing error processing according to another embodiment of the present disclosure.

FIG. 12 is a flowchart illustrating a sensing error processing according to another embodiment of the present disclosure.

Referring to FIG. 12, in the sensing mode, the sensing error processing unit 132 adds the sensed data received for each pixel on a block basis and divides the result by the number of pixels of a corresponding block to calculate the block sensed data average value (steps S121 and S122). The sensing mode may be the ON RF mode. The sensing error processing unit 132 calculates an absolute value of the difference Ci of the block sensed data average values between one block of the first group and one block of the second group that are neighboring (step S123).

When the difference Ci of the block sensed data average values calculated between the neighboring blocks is greater than a predetermined first threshold value $TH_1$, the sensing error processing unit 132 counts them as the sensing error blocks in which the pixel and the sensed data are mismatched due to a synchronization problem between the level shifters LSA and LSB (step S124). The sensing error processing unit 132 increases a count value by 1 when the sensing error block is detected, and accumulates a sensing error count value COUNT by 1 each time a sensing error block is detected in the next neighboring blocks (step S125).

The sensing error processing unit 132 compares the sensing error count value COUNT with a second threshold value $TH_2$, and when the sensing error count value COUNT is greater than the second threshold value $TH_2$, ultimately determines that there is an error in the sensed data (step S126). In this case, the sensing error processing unit 132 may generate a flag FLAG. When a sensing error block is detected, the sensing error processing unit 132 may reset the timing controller 130 or output the burnt signal BDP of a specific level (step S127). Steps S122 to S126 may be repeatedly performed for all the blocks A1 to A135 and B1 to B135 of the first and second groups.

The second threshold $TH_2$ may be set based on an experimental result confirming the verification of the sensed data between the blocks. In another embodiment, the second threshold value $TH_2$ may be set as the number of gap tapes adhered to the rear surface of the display panel 100. When the sensing error block is not detected, the compensation unit 131 modulates the pixel data based on the sensed data received from the sensing unit 111 and transmits it to the data driver 110 (step S128).

Figure 13:
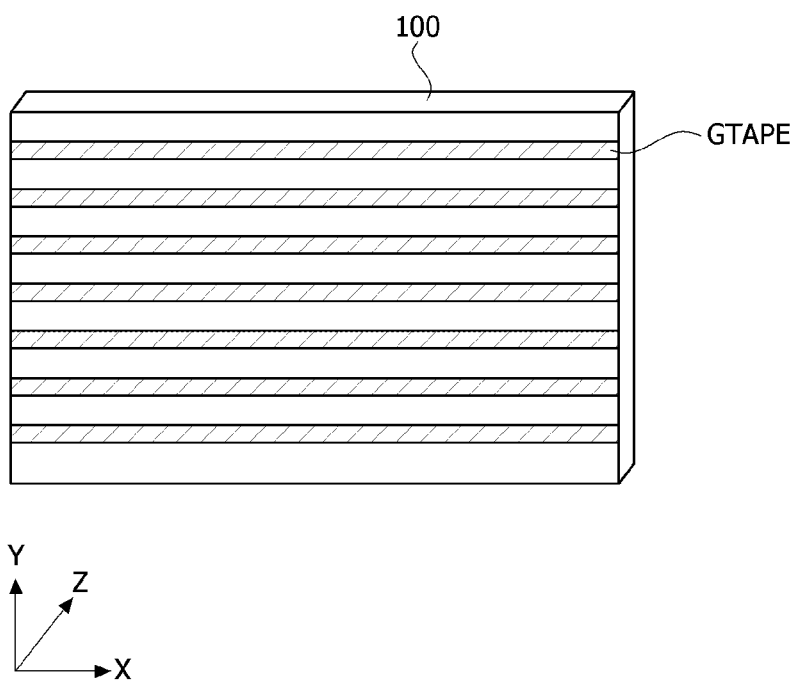
FIG. 13 is a diagram showing an example of a gap tape adhered to a display panel.

FIG. 13 is a diagram illustrating an example of a gap tape GTAPE adhered to the display panel 100.

Referring to FIG. 13, a plurality of gap tapes GTAPE may be adhered to a surface opposite to a light emission direction in the display panel 100, for example, the rear surface of the display panel 100. The gap tape GTAPE may be a metal tape capable of dissipating the heat generated from the display panel 100.

There may be a temperature difference in the display panel 100 between a portion where the gap tape GTAPE is adhered and a portion where the gap tape GTAPE is not adhered. In transistors of the pixel circuit, the amount of current may vary depending on the temperature. As a result, on the screen, a sensed data value may be different between a block in a portion where the gap tape GTAPE is adhered and a block in a portion where the gap tape GTAPE is not adhered. In order to exclude such a difference in the sensed data for each block and detect only a sensing error in which the level shifters are not synchronized, the second threshold value $TH_2$ may be set as the number of the gap tapes GTAPE.

The display device of the present disclosure may acquire an effect that the pixels are driven at twice the frame rate, since pixel data and black data are written to the pixels every frame period in the normal driving mode in order to shorten a motion picture response time (MPRT). For example, when the frame rate of an input image is 120 Hz, the pixels are driven at a frame rate of 240 Hz. In this method, as described above, it is beneficial to divide and drive the screen into the blocks of the first group and the blocks of the second group using two level shifters.

For example, in response to the first gate timing control signal GSC1 from the first level shifter LSA, the first shift register SR1 in charge of the first-first block A1 applies the pulse of the scan signal SCAN synchronized with the data voltage Vdata in first to sixteenth pixel lines to the gate line 1041 so that the data voltage Vdata is charged to the pixels. At the same time, according to the second gate timing control signal GSC2 from the second level shifter LSB, in the second shift register SR2 in charge of the second-first block B1, the first control nodes Q of the signal transmission units are charged. In this case, in the second-first block B1, the sensed data of seventeenth to thirty-second pixel lines is in a transmission standby state.

In response to the first gate timing control signal GSC1 from the second level shifter LSB, the first shift register SR1 in charge of the second-first block B1 applies the pulse of the scan signal SCAN synchronized with the data voltage Vdata in the seventeenth to thirty-second pixel lines to the gate line 1041, so that the data voltage Vdata is charged to the pixels. At the same time, according to the second gate timing control signal GSC2 from the first level shifter LSA, in the second shift register SR2 in charge of the first-second block A2, the first control nodes Q of the signal transmission units are charged. In this case, in the first-second block A2, the sensed data of thirty-three to forty-eighth pixel lines is in a transmission standby state.

Figure 14:
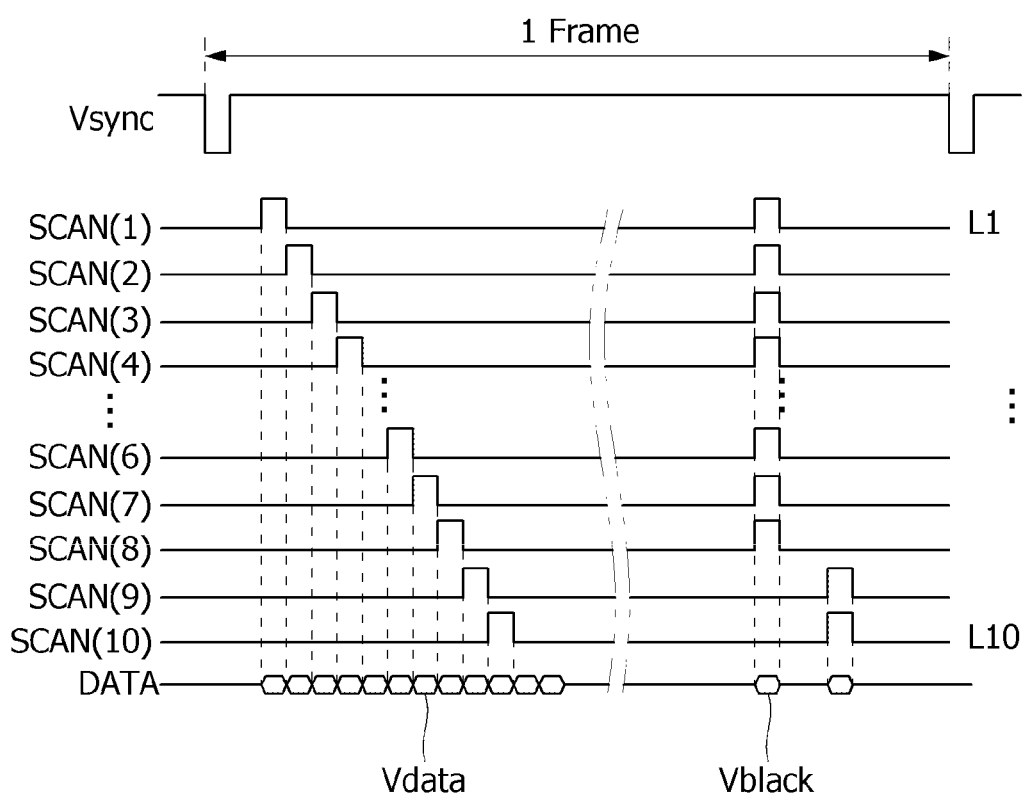
FIGS. 14 and 15 are diagrams showing a pixel data addressing period and a black grayscale insertion period which are time-divided within one frame period.
Figure 15:
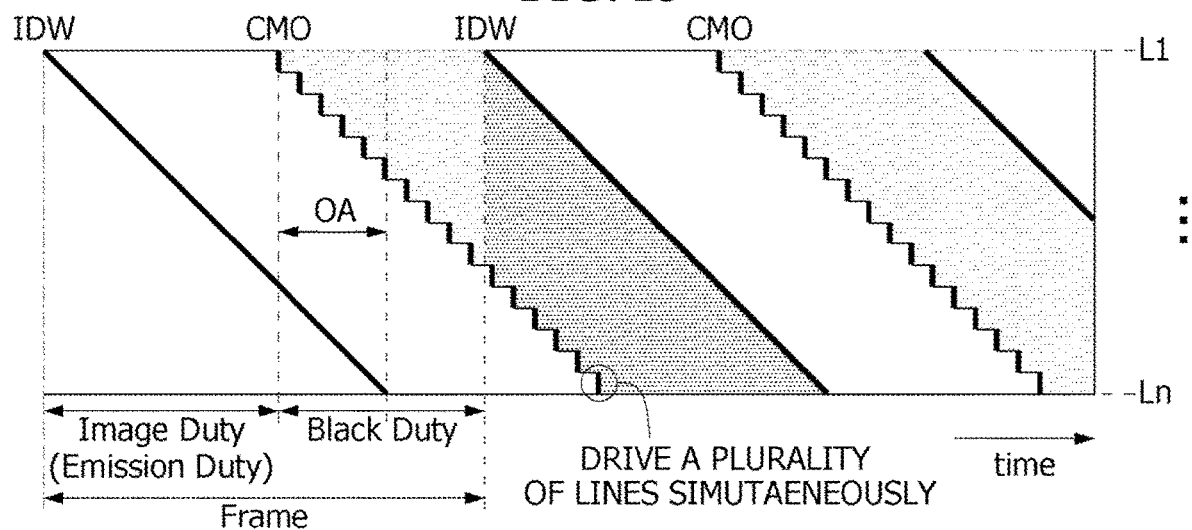

FIGS. 14 and 15 are diagrams illustrating a pixel data addressing period IDW and a black grayscale insertion period CMO which are time-divided within one frame period.

Referring to FIGS. 14 and 15, a light emission duty of the pixels is determined by a time difference between the start timing of a pixel data addressing period IDW and the start timing of a black grayscale insertion period CMO within one frame period.

The timing controller 130 may control the timing of the pixel data addressing period IDW and the black grayscale insertion period CMO. For example, the start timing of the pixel data addressing period IDW and the start timing of the black grayscale insertion period CMO may be controlled by the start pulse from the level shifter 140.

The data driver 110 converts the pixel data or data for sensing from the timing controller 130 into the data voltage Vdata during the pixel data addressing period IDW. The data driver 110 converts black grayscale data from the timing controller 130 into a black grayscale voltage Vblack during the black grayscale insertion period CMO. As shown in FIG. 14, the gate driver 120 outputs a first pulse of the scan signal SCAN synchronized with the data voltage Vdata and then outputs a second pulse synchronized with the black grayscale voltage Vblack.

During the pixel data addressing period IDW, the pulses of the scan signals SCAN(1) to SCAN(10) are sequentially shifted by one-pixel line. Accordingly, the data voltage Vdata is sequentially charged to the pixels by one-pixel line by the scan signals SCAN(1) to SCAN(10) during the pixel data addressing period IDW.

During the black grayscale insertion period CMO, the pulses of the scan signals SCAN(1) to SCAN(10) are shifted by a plurality of pixel lines. Accordingly, the black grayscale voltage Vblack is simultaneously applied to the pixels arranged in the plurality of pixel lines, and then is simultaneously applied to the pixels arranged in the next plurality of pixel lines.

In an example of the block division driving method, after the data voltage Vdata is sequentially charged, by one pixel line, to the pixels in the first to fourth pixel lines of the first-first block A1, the black grayscale voltage Vblack may be simultaneously applied to the first to eighth pixel lines arranged in the second-first block B1. Subsequently, the data voltage Vdata is sequentially charged, by one pixel line, to the pixels in the fifth to eighth pixel lines of the first-first block A1, and then the black grayscale voltage Vblack may be simultaneously applied to the ninth to sixteenth pixel lines arranged in the second-first block B1.

Figure 16:
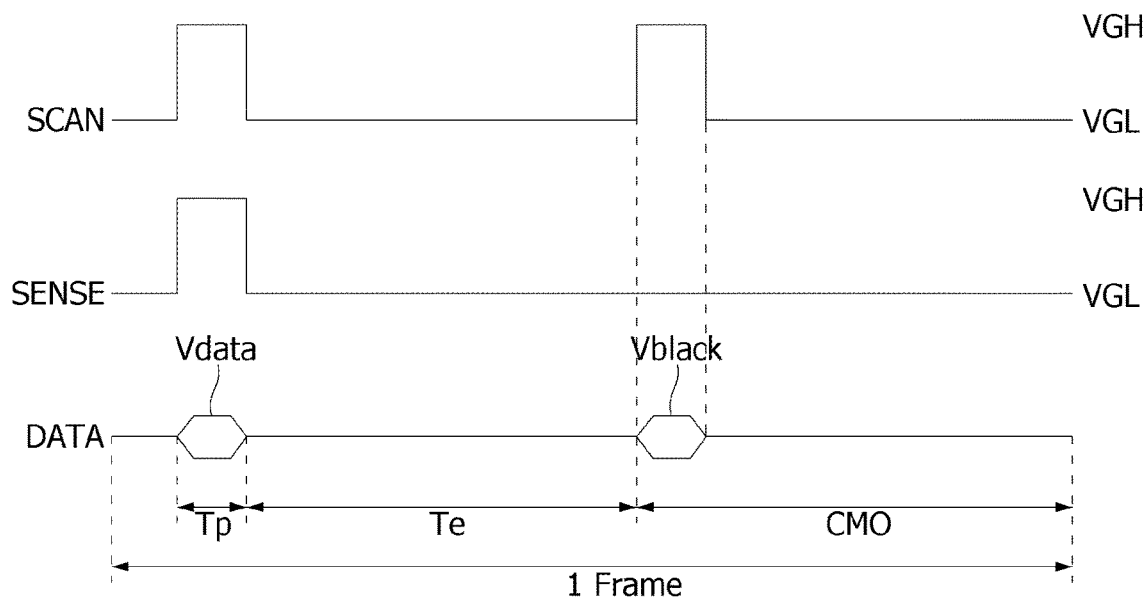
FIG. 16 is a waveform diagram showing a gate signal during a pixel data addressing period and a black grayscale insertion period.

FIG. 16 is a waveform diagram showing a gate signal during a pixel data addressing period IDW and a black grayscale insertion period CMO. As shown in FIG. 16, the pixel data addressing period IDW may be divided into a programming period Tp in which the data voltage Vdata is charged to the pixels and a light emission period Te in which the pixels are driven.

Figure 17A:
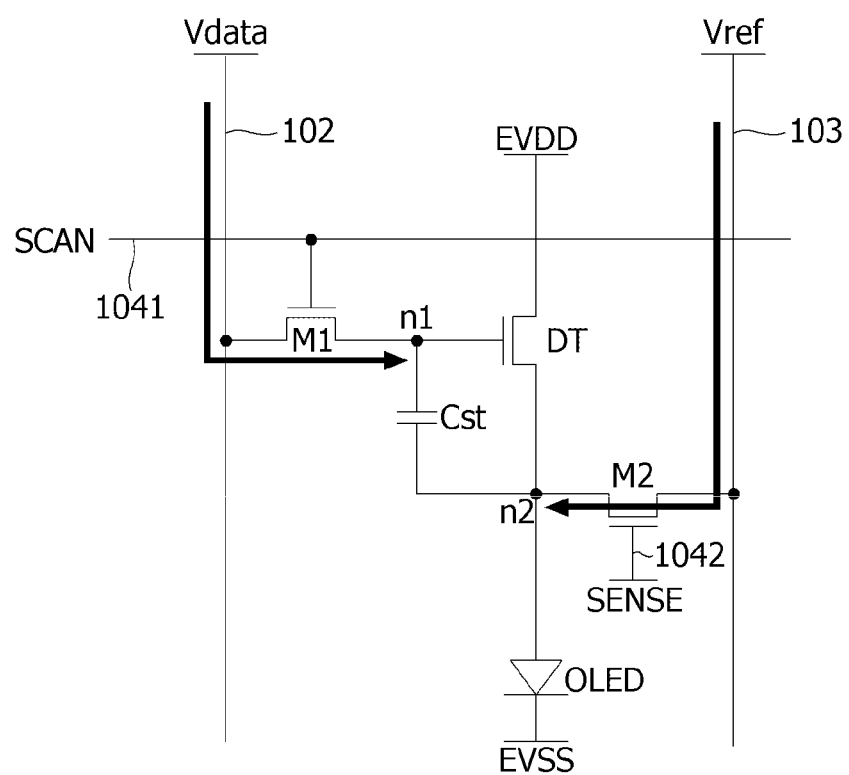
FIGS. 17A to 17C are circuit diagrams showing an operation of a pixel circuit during a pixel data addressing period and a black grayscale insertion period.
Figure 17B:
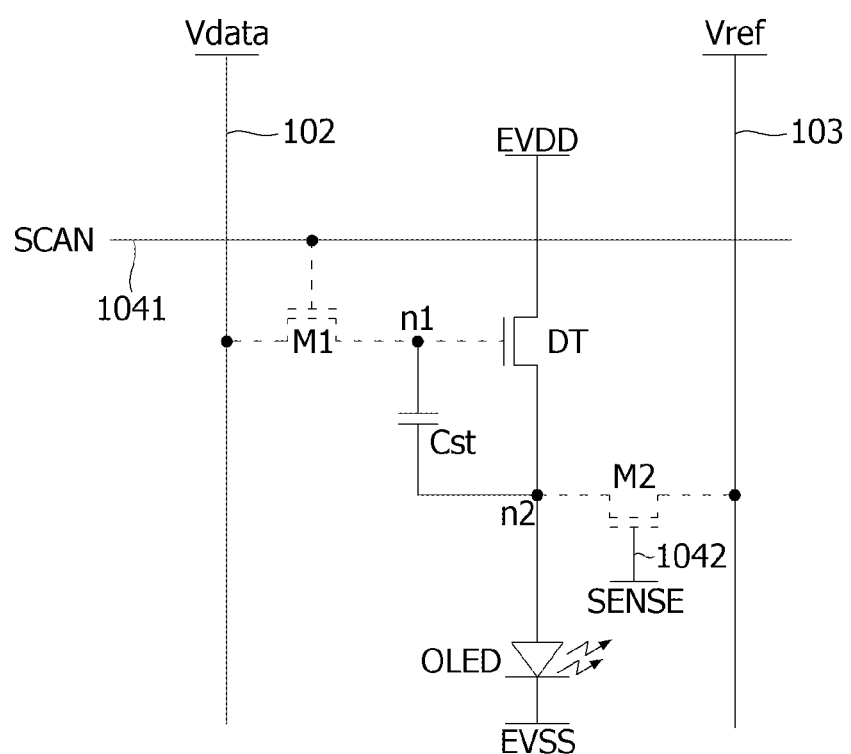
Figure 17C:
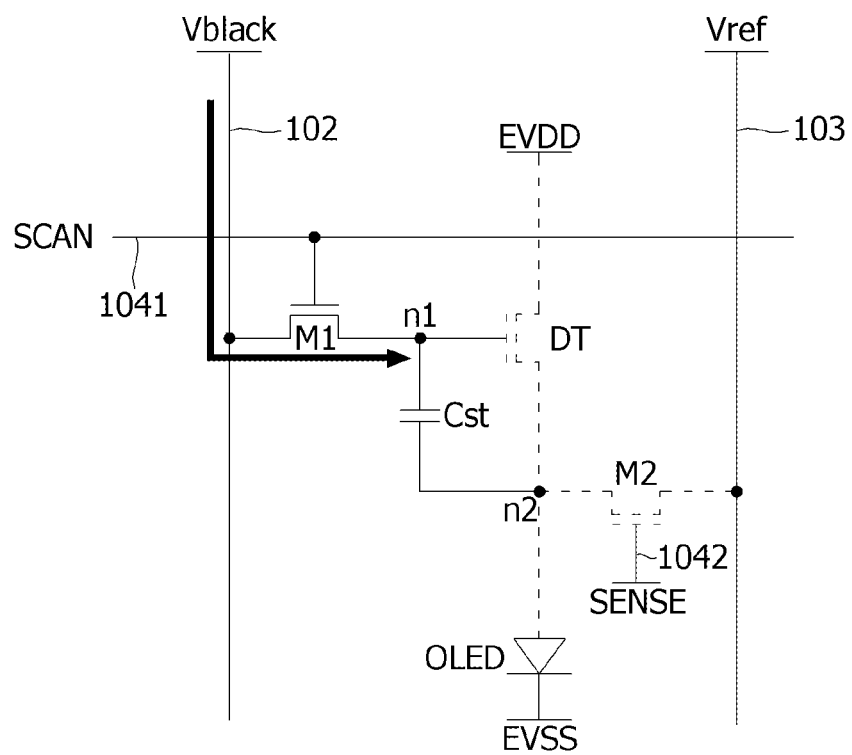
Figure 18:
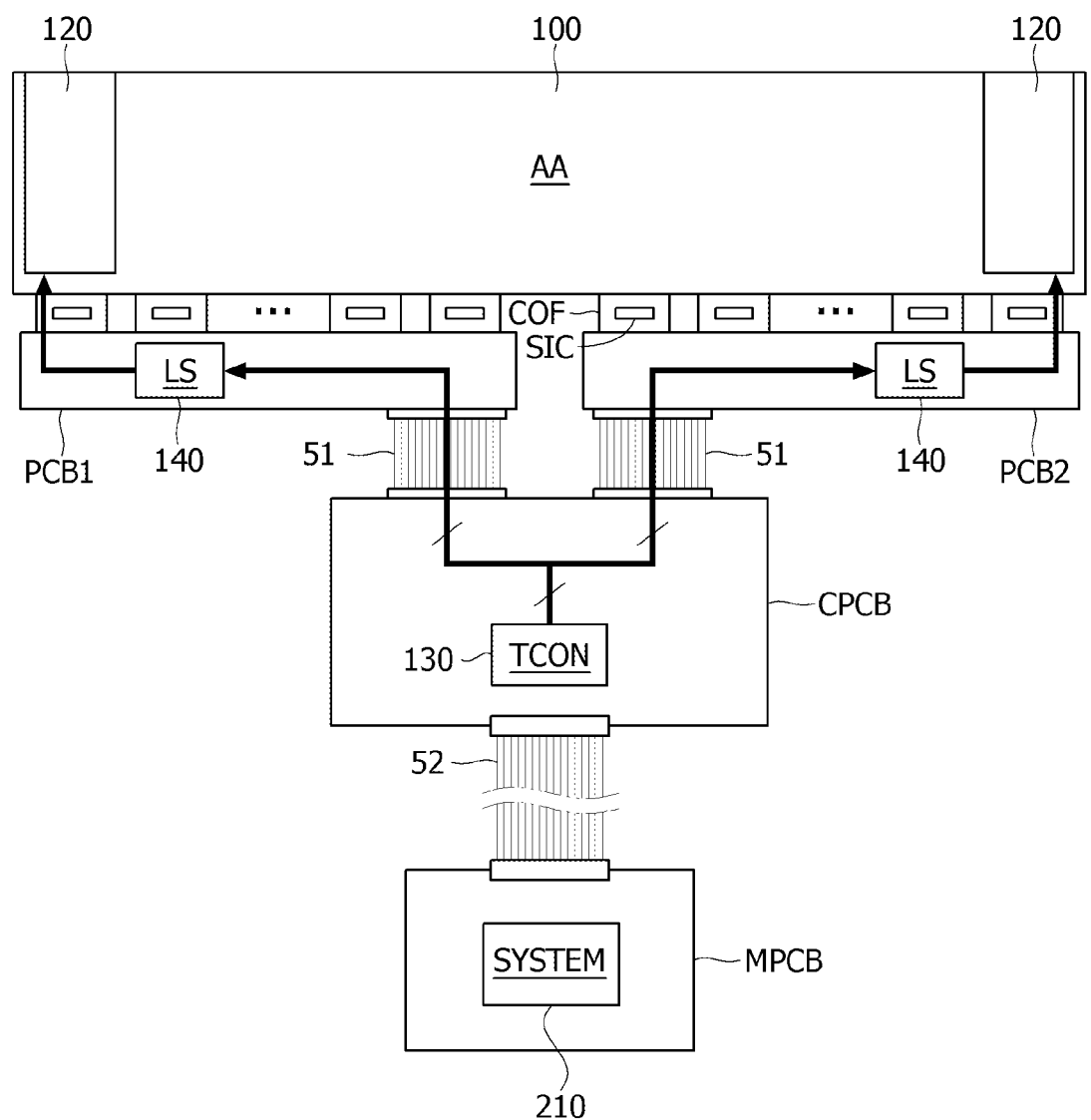
FIGS. 18 and 19 are diagrams showing another example of a display panel, a source PCB, a control board, and a system board in a display device according to an embodiment of the present disclosure.
Figure 19:
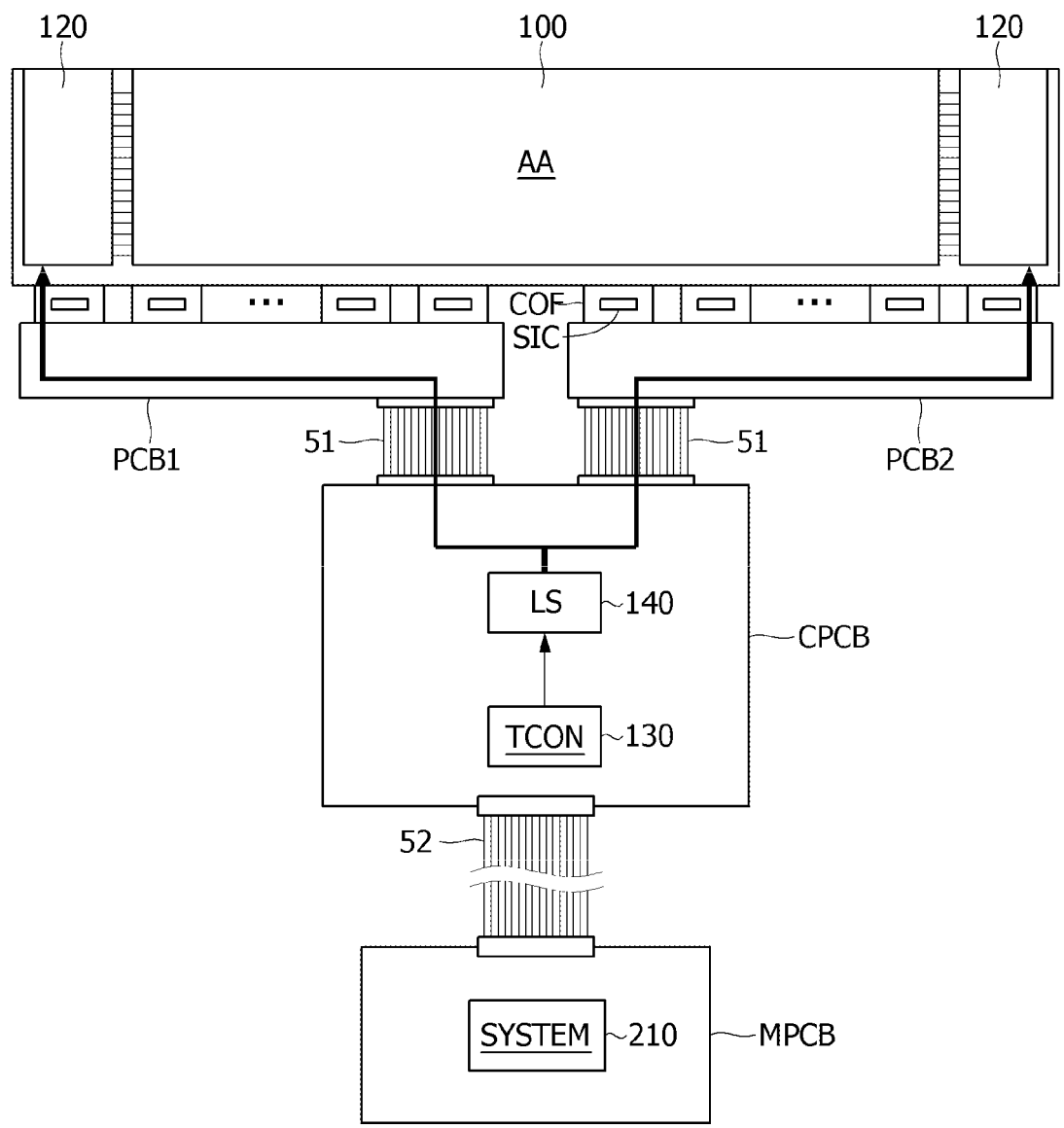

FIGS. 17A to 17C are circuit diagrams showing the operation of a pixel circuit during a pixel data addressing period IDW and a black grayscale insertion period CMO. FIGS. 18 and 19 are diagrams showing another example of a display panel, a source PCB, a control board, and a system board in a display device according to an embodiment of the present disclosure.

Referring to FIG. 17A, during the programming period Tp, the first switch element M1 of the pixel circuit is turned on in response to the first pulse of the scan signal SCAN to supply the data voltage Vdata of the pixel data RGB to the first node n1. At the same time, during the programming period Tp, the second switch element M2 is turned on in response to the pulse of the sensing signal to supply the reference voltage Vref to the second node n2. The data voltage Vdata is a data voltage for sensing in the sensing mode and a data voltage of the pixel data in the normal driving mode.

Referring to FIG. 17B, the first and second switch elements M1 and M2 of the pixel circuit are turned off during the light emission period Te. During the light emission period Te, a current flows through the light emitting element OLED according to the gate-source voltage Vgs of the driving element DT, so that the light emitting element OLED may emit light.

Referring to FIG. 17C, the first switch element M1 of the pixel circuit is turned on in response to the second pulse of the scan signal SCAN generated during the black grayscale insertion period CMO to apply the black grayscale voltage Vblack to the first node n1. The second switch element M2 maintains a turn-off state during the black grayscale insertion period CMO. During the black grayscale insertion period CMO, since the voltage Vgs between the first node n1 and the second node n2 is less than the threshold voltage of the driving element DT, the driving element DT is turned off, so that the light emitting element OLED is turned off.

The display device according to another embodiment of the present disclosure may, as shown in FIGS. 18 and 19, apply the gate signal SCAN and SENSE to the gate lines of the entire screen by using one level shifter 140.

Figure 20:
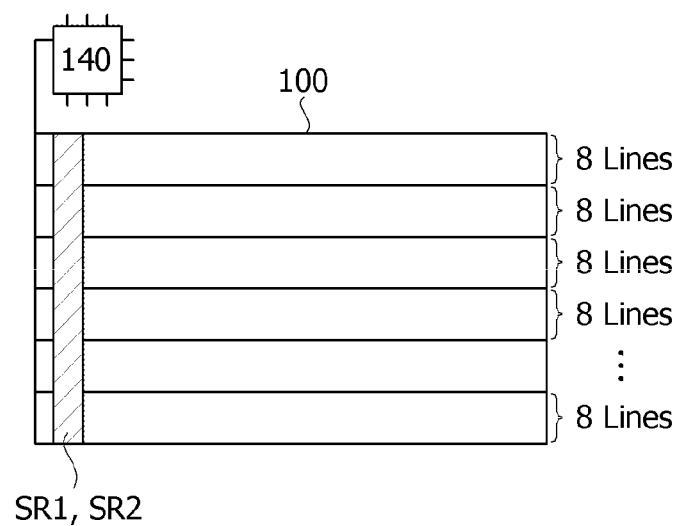
FIG. 20 is a diagram illustrating pixel lines to which a gate signal is applied by a shift clock outputted from a specific pin of a level shifter.

FIG. 20 is a diagram illustrating pixel lines to which a gate signal is applied by a shift clock outputted from a specific pin of a level shifter.

Referring to FIG. 20, the level shifter 140 applies the first gate timing control signal GSC1 to the first shift register SR1 and the second gate timing control signal GSC2 to the second shift register SR2. In response to the first gate timing control signal GSC1, the first shift register SR1 sequentially applies the scan signal SCAN to the gate lines 1041 of the pixel array AA. In response to the second gate timing control signal GSC2, the second shift register SR2 sequentially applies the sense signal SENSE to the gate lines 1042 of the pixel array AA.

The level shifter 140 may output an eight-phase shift clock. If any one of the shift clocks outputted from the level shifter 140 is out of phase, the sensed data obtained from the pixel lines to which the out-of-phase shift clock is applied may be lost or shifted on a pixel line basis.

For example, the pixel lines to which the gate signal is applied according to an eighth shift clock in the eight-phase shift clock are an eighth pixel line, a sixteenth pixel line, . . . , a two thousand one hundred sixtieth pixel line, and the like, which are spaced apart by eight-pixel line intervals. In the case of the eight-phase shift clock, the eighth shift clock is commonly inputted to the signal transmission units of the multiples of eight in the first and second shift registers. The signal transmission units of the multiples of eight are connected to the gate lines of the pixel lines spaced apart by eight-pixel line intervals and apply the gate signal SCAN and SENSE when the shift clock is inputted to the gate lines. Therefore, when the eighth shift clock is out of phase, the sensing timing is shifted from the pixel lines every eight line intervals, and the sensed data obtained from the pixel lines becomes incorrect.

The present disclosure may determine a sensing error based on a result of comparing the sensed data obtained from some pixel lines of the pixel array AA with the sensed data obtained from all pixel lines of the pixel array AA. Here, the some pixel lines of the pixel array AA are pixel lines to which the gate signal SCAN and SENSE is applied according to the shift clock outputted from a specific pin of the level shifter 140. These pixel lines are spaced at equal intervals on the pixel array AA by an interval of the pixel lines corresponding to a phase shift period of the shift clock.

The sensing error processing unit 132 of the timing controller 130 adds the sensed data obtained from the pixel lines spaced at equal intervals in the pixel array AA and calculates an average of the sum. Here, in the case of an N (N being a natural number equal to or greater than 2) shift clock, the pixel lines spaced at equal intervals may be pixel lines spaced at N intervals. The sensing error processing unit 132 adds the sensed data obtained from all pixel lines in the pixel array AA and calculates an average of the sum. Hereinafter, the average value of the sensed data obtained from the pixel lines spaced at equal intervals is referred to as "average value of equal-interval sensed data," and the average value of the sensed data obtained from all pixel lines in the pixel array AA is referred to as "average value of all sensed data."

The sensing error processing unit 132 compares the average value of the equal-interval sensed data with the sum of the average value of all sensed data and a predetermined (or preset or selected) threshold value, and if the average value of the equal-interval sensed data is greater than that, determines that a sensing error has occurred. The threshold value may be set based on an experimental result confirming the sensed data verification. When a sensing error is detected, the sensing error processing unit 132 may reset the timing controller 130 to recover the screen while preventing image quality defects from appearing on the screen, or may output the burnt signal BDP of a specific level to block the output of the main power unit of the host system 210.

Figure 21:
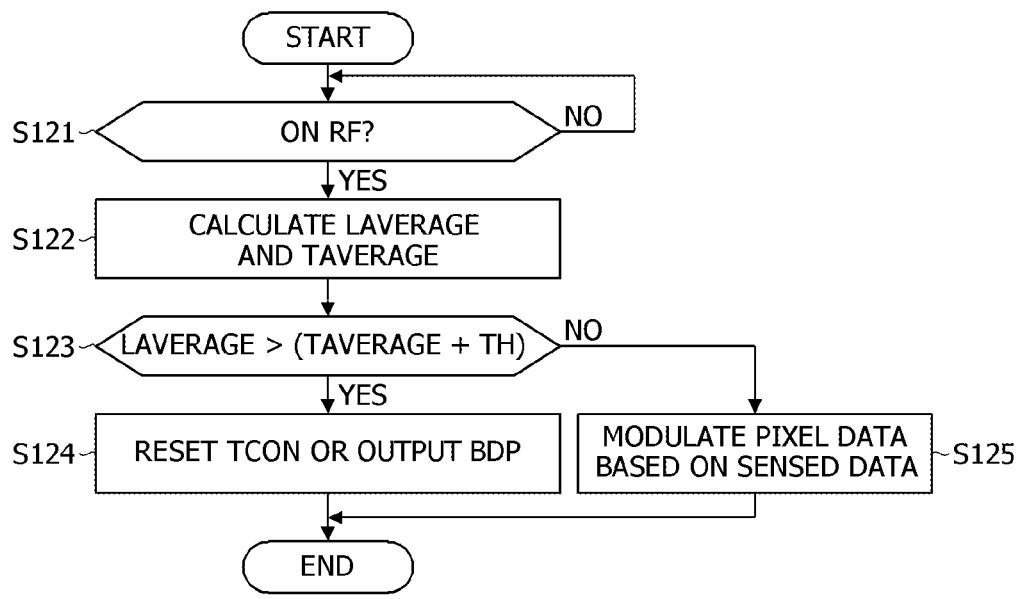
FIG. 21 is a flowchart illustrating a sensing error processing according to still another embodiment of the present disclosure.

FIG. 21 is a flowchart showing a sensing error processing according to still another embodiment of the present disclosure.

Referring to FIG. 21, in the sensing mode, the sensing error processing unit 132 calculates an average value LAVERAGE of the equal-interval sensed data and an average value TAVERAGE of all sensed data, and compares the average value LAVERAGE of the equal-interval sensed data with the sum of the average value TAVERAGE of all sensed data and a threshold value TH (steps S121 and S122). The sensing mode may be the ON RF mode.

In the sensing mode, when the average value LAVERAGE of the equal-interval sensed data is greater than the sum of the average value TAVERAGE of all sensed data and the threshold value TH, the sensing error processing unit 132 determines that a sensing error has occurred (step S123).

The sensing error processing unit 132 may generate a flag when a sensing error is detected. In response to the flag from the sensing error processing unit 132, the gate control unit 134 may synchronize the first and second gate timing control signals GCS1 and GCS2 and transmit it again to the level shifter 140. When a sensing error is detected, the sensing error processing unit 132 may reset the timing controller 130 or output the burnt signal BDP of a specific level (step S124).

When a sensing error is not detected, the compensation unit 131 modulates the pixel data based on the sensed data received from the sensing unit 111 and transmits it to the data driver 110 (step S125).

Figure 22:
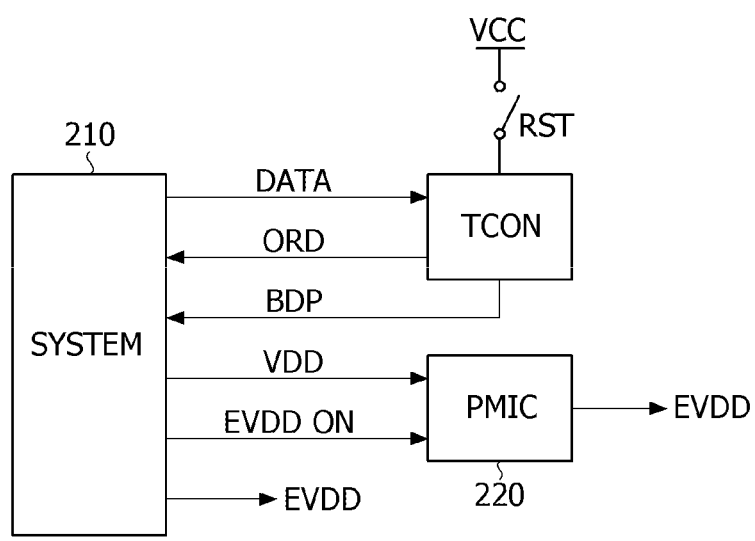
FIG. 22 is a diagram showing signals and power transmitted between a host system, a timing controller, and a power supply unit.

FIG. 22 is a diagram showing signals and power transmitted between a host system 210, a timing controller 130, and a power supply unit PMIC 220.

Referring to FIG. 22, the host system 210 outputs the power voltage VDD, the pixel driving voltage EVDD, and an EVDD ON signal. The power voltage VDD is inputted to the power supply unit 220.

The power supply unit 220 starts to be driven by the power voltage VDD from the host system 210, and when the EVDD ON signal is inputted, sequentially outputs DC voltages such as the gamma reference voltage, the gate-on voltage VGH, the gate-off voltage VGL, the low potential power voltage EVSS, the reference voltage Vref, and the IC driving voltage Vcc according to a preset power on sequence.

Figure 24:
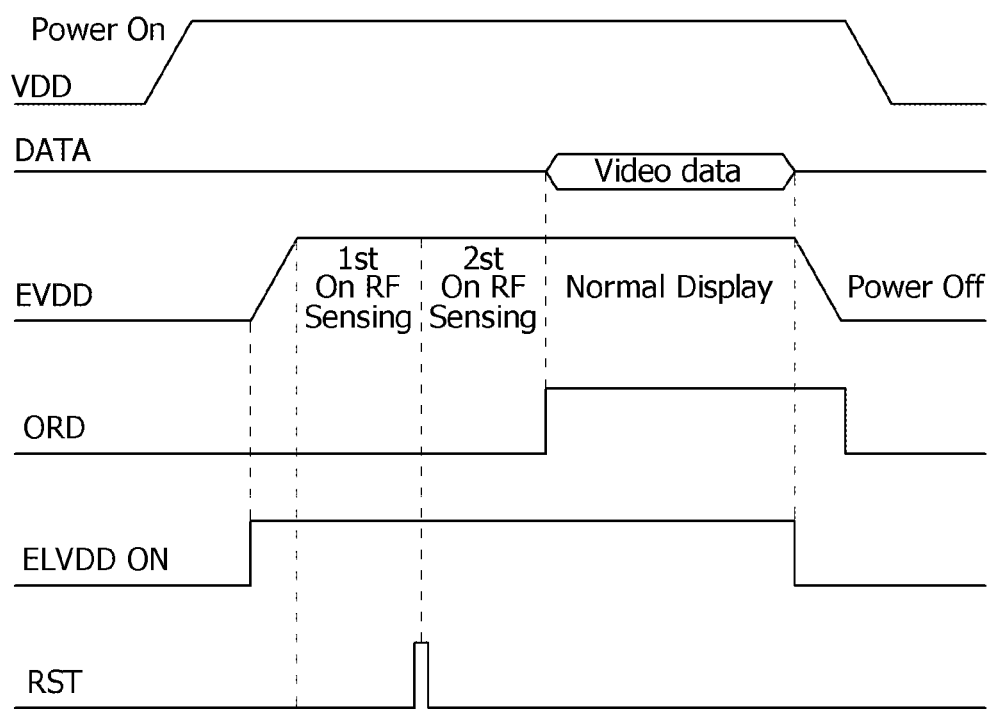
FIG. 24 is a waveform diagram showing an example in which pixels are normally driven in a normal driving mode by reflecting a sensed result in an ON RF mode after a timing controller is reset.
Figure 25:
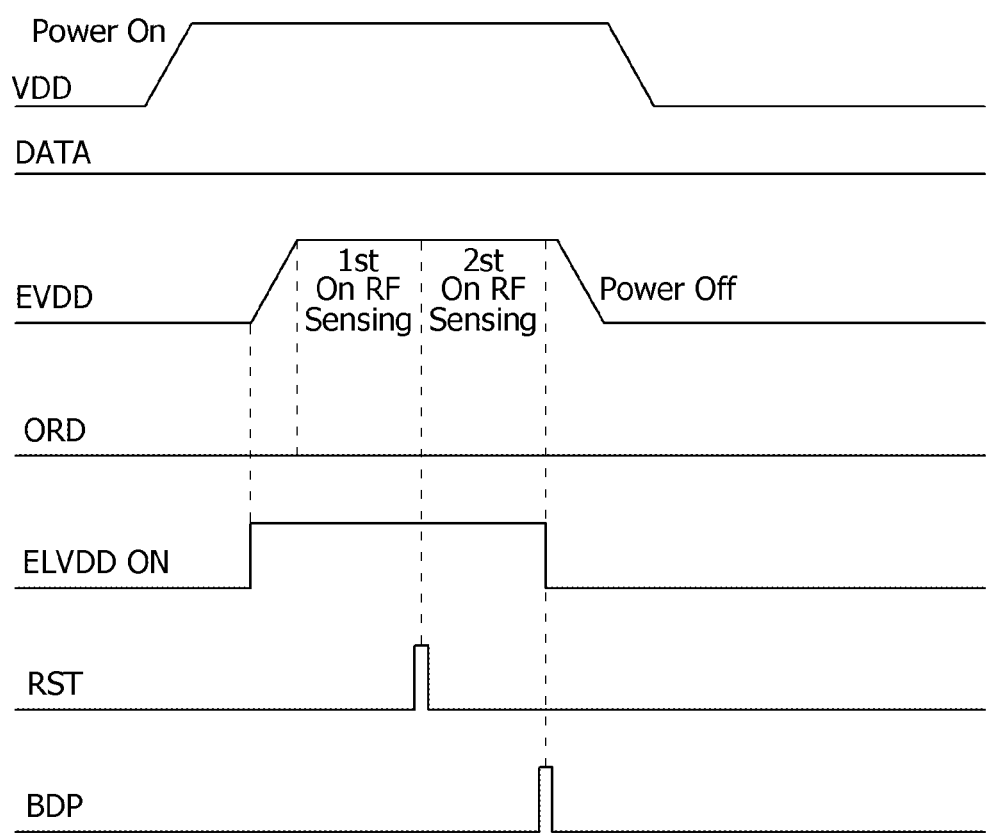
FIG. 25 is a waveform diagram showing an example in which a pixel driving voltage is cut off and a power off sequence is performed when a sensing error is repeatedly detected in the ON RF mode.

In the ON RF mode, when the sensed data for all pixels in the pixel array AA is received, the timing controller 130 transmits a sensing completion signal (On RF Done) ORD to the host system 210. As shown in FIGS. 24 and 25, in response to a high level voltage of the sensing completion signal ORD immediately after the power-on sequence, the host system 210 starts to transmit the pixel data DATA of an image and the timing signal synchronized therewith to the timing controller 130.

When a sensing error is repeatedly detected as in the above-described embodiments, the timing controller 130 may cut off the pixel driving voltage EVDD by applying the burnt signal BDP to the host system 210.

Figure 23:
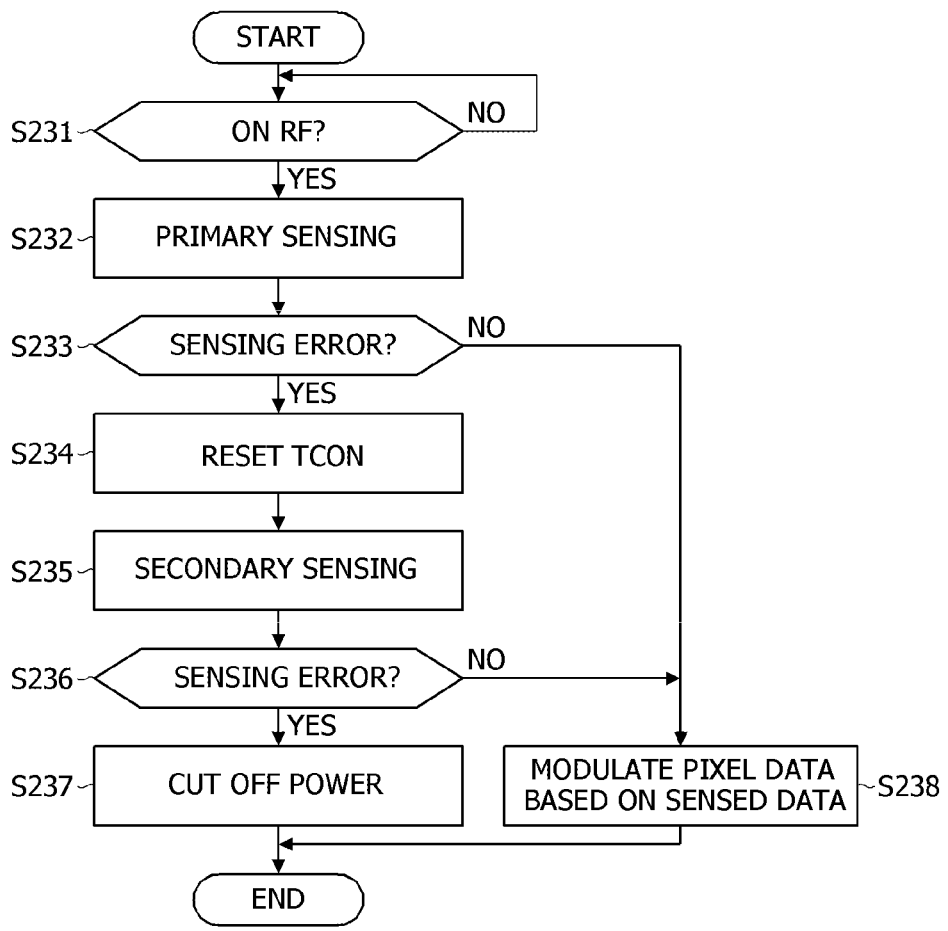
FIG. 23 is a flowchart showing a reset process and a power off process of a timing controller when a sensing error is detected in a sensing mode.

FIG. 23 is a flowchart showing a reset process and a power cut off process of a timing controller when a sensing error is detected in a sensing mode. FIG. 24 is a waveform diagram showing an example in which pixels are normally driven in a normal driving mode by reflecting a sensed result in an ON RF mode after a timing controller is reset. FIG. 25 is a waveform diagram showing an example in which a pixel driving voltage is cut off and a power off sequence is performed when a sensing error is repeatedly detected in the ON RF mode.

Referring to FIGS. 23 to 25, when a primary sensing error is detected in the sensing mode (ON RF) (steps S231, S232, and S233), the sensing error processing unit 132 resets the timing controller 130 to perform a secondary sensing (steps S234 and S235).

If a sensing error is not detected as a result of the primary sensing, as shown in FIG. 24, the timing controller 130 transmits the sensing completion signal ORD to the host system 210 to receive a pixel data Video data of an input image. The timing controller 130 modulates the pixel data inputted from the host system 210 into a compensation value updated based on the sensed data and transmits it to the data driver 110 (step S238).

When a sensing error is detected as a result of the secondary sensing, the sensing error processing unit 132 transmits the burnt signal BDP of a specific level to the host system to cut off the pixel driving voltage EVDD (steps S236 and S237). Then, the host system stops outputting the pixel driving voltage EVDD, and as shown in FIG. 25, since the sensing completion signal ORD is not received from the timing controller 130, does not transmit the data of the input image to the timing controller 130. When a sensing error is repeated in this way, the power supply unit 220 stops outputting according to a preset power off sequence in response to the EVDD ON signal inverted to a low level.

When a sensing error is not detected as a result of the secondary sensing, the timing controller 130 transmits the sensing completion signal ORD to the host system 210 and receives the pixel data Video data of the input image. The timing controller 130 modulates the pixel data inputted from the host system 210 into a compensation value updated based on the sensed data and transmits it to the data driver 110 (step S238).

The technical benefits achieved by the present disclosure, the means for achieving the benefits, and effects of the present disclosure described above do not specify essential features of the claims, and thus, the scope of the claims is not limited to the detailed description of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
    a display panel including a plurality of data lines, a plurality of gate lines, and a plurality of pixel lines coupled to the data lines and the gate lines and having pixels arranged therein;
    a sensing circuit configured to sense electrical properties of each of the pixels immediately after power starts to be applied to the display device;
    a timing controller including:
        a compensation circuit configured to modulate pixel data to be written to the pixels based on sensed data from the sensing circuit,
        a sensing error processing circuit configured to analyze the sensed data to detect a sensing error, and
        a gate control circuit configured to output a gate timing control signal;
    a level shifter configured to receive the gate timing control signal and output a clock; and
    a gate driver configured to receive the clock from the level shifter and supplying, supply a gate signal to the gate lines.

2. The display device of claim 1, wherein each of the pixels receives a pixel driving voltage, a low potential power voltage, a reference voltage, a data voltage, and the gate signal, and
    each of the pixels includes:
    a light emitting element; and
    a driving element configured to drive the light emitting element.

3. The display device of claim 2, wherein the sensing error processing circuit outputs a burnt signal of a specific level when the sensing error is repeatedly detected.

4. The display device of claim 3, further comprising:
a short circuit detection circuit configured to output the burnt signal when a short circuit in the pixel driving voltage and the low potential power voltage is sensed in the display panel.

5. The display device of claim 3, further comprising:
a host system configured to transmit the pixel data to the timing controller and output the pixel driving voltage,
wherein the host system blocks an output of the pixel driving voltage in response to the burnt signal.

6. The display device of claim 2, wherein the gate signal includes a scan signal and a sensing signal,
the pixel driving voltage is applied to a first electrode of the driving element, an anode electrode of the light emitting element is coupled to a second electrode of the driving element, and the low potential power voltage is applied to a cathode electrode of the light emitting element, and
each of the pixels further includes:
a first switch element configured to apply the data voltage to a gate electrode of the driving element in response to a pulse of the scan signal;
a second switch element configured to couple a sensing line to which the reference voltage is applied to the second electrode of the driving element in response to a pulse of the sensing signal; and
a capacitor coupled between the gate electrode of the driving element and the second electrode of the driving element.

7. The display device of claim 6, wherein the gate control circuit outputs first and second gate timing control signals, and
the level shifter includes:
a first level shifter configured to output the clock in response to the first and second gate timing control signals; and
a second level shifter configured to output the clock in response to the first and second gate timing control signals;
the gate driver includes:
a first shift register configured to output the scan signal in response to the clock output from the first level shifter or the second level shifter; and
a second shift register configured to output the sensing signal in response to the clock output from the first level shifter or the second level shifter.

8. The display device of claim 7, wherein a screen of the display panel includes:
a first group divided into a plurality of first blocks; and
a second group divided into a plurality of second blocks,
wherein the first blocks and the second blocks are alternately arranged at one block intervals,
wherein the first level shifter applies the clock to the first and second shift registers respectively connected to gate lines of the first blocks, and
wherein the second level shifter applies the clock to the first and second shift registers respectively connected to gate lines of the second blocks.

9. The display device of claim 2, further comprising:
a power supply circuit configured to output a voltage of the gate signal, a gamma reference voltage, the low potential power voltage, and an IC driving voltage for driving the timing controller; and
a data driver configured to receive the pixel data from the timing controller, convert the pixel data into a gamma compensation voltage divided from the gamma reference voltage, and output the data voltage,
wherein the sensing error processing circuit resets the timing controller by temporarily blocking the IC driving voltage.

10. The display device of claim 1, wherein the sensing error processing circuit outputs a flag signal when the sensing error is detected, and
wherein the gate control circuit outputs the gate timing control signal again in response to the flag signal.

11. A display device comprising:
a display panel including a plurality of data lines, a plurality of gate lines, and a plurality of pixel lines coupled to the data lines and the gate lines and having pixels arranged therein;
a sensing circuit configured to sense electrical properties of each of the pixels;
a timing controller including:
a compensation circuit configured to modulate pixel data to be written to the pixels based on sensed data from the sensing circuit,
a sensing error processing circuit configured to analyze the sensed data to detect a sensing error, and
a gate control circuit configured to output a gate timing control signal;
a level shifter configured to receive the gate timing control signal and output a clock;
a gate driver configured to receive the clock from the level shifter and supply a gate signal to the gate lines; and
a host system configured to transmit the pixel data to the timing controller when a sensing completion signal is received from the timing controller,
wherein the sensing error processing circuit resets the timing controller when the sensing error is detected, and
wherein the timing controller transmits the sensing completion signal to the host system after being reset or after secondary sensing of the pixels.

12. A driving method of a display device comprising:
sensing, for each of pixels of a display panel, electrical properties of the pixels immediately after power is applied to the display device to generate a sensed data;
analyzing the sensed data to detect a sensing error; and
resetting a timing controller configured to control an operation timing of a display panel driver that drives the display panel, when the sensing error is detected.

13. The driving method of a display device of claim 12, further comprising:
outputting a flag signal when the sensing error is detected; and
outputting again a gate timing control signal for controlling a gate driver that supplies a gate signal to gate lines of the display panel, in response to the flag signal.

14. The driving method of a display device of claim 12, further comprising:
blocking a pixel driving voltage applied to the pixels when the sensing error is repeatedly detected.

15. A driving method of a display device comprising:
sensing, for each of pixels of a display panel, electrical properties of the pixels to generate a sensed data;
analyzing the sensed data to detect a sensing error; and
resetting a timing controller configured to control an operation timing of a display panel driver that drives the display panel, when the sensing error is detected, wherein said sensing electrical properties of the pixels includes:

sensing the pixels by dividing a screen of the display panel into a first group divided into a plurality of first blocks and a second group divided into a plurality of second blocks;

calculating, in neighboring first and second blocks, an average value of sensed data obtained from pixels of the first block, and an average value of sensed data obtained from pixels of the second block;

calculating a difference between the average value of sensed data obtained from pixels of the first block and the average value of sensed data obtained from pixels of the second block, and comparing the difference with a first threshold value; and determining that the sensing error has occurred when the difference is greater than the first threshold value.

16. A driving method of a display device comprising:

sensing, for each of pixels of a display panel, electrical properties of the pixels to generate a sensed data;

analyzing the sensed data to detect a sensing error; and resetting a timing controller configured to control an operation timing of a display panel driver that drives the display panel, when the sensing error is detected, wherein said sensing electrical properties of the pixels includes:

sensing the pixels by dividing a screen of the display panel into a first group divided into a plurality of first blocks and a second group divided into a plurality of second blocks;

calculating, in neighboring first and second blocks, an average value of sensed data obtained from pixels of the first block, and an average value of sensed data obtained from pixels of the second block;

calculating a difference between the average value of sensed data obtained from pixels of the first block and the average value of sensed data obtained from pixels of the second block to compare the difference with a first threshold value;

increasing a count value by 1 when the difference is greater than the first threshold value, and in next neighboring blocks, whenever a difference between an average value of sensed data obtained from pixels of the first block and an average value of sensed data obtained from pixels of the second block is greater than the first threshold value, accumulating the count value by 1; and determining that the sensing error has occurred when the count value accumulated is greater than a second threshold value.

17. The driving method of a display device of claim 16, further comprising:

setting the second threshold value to the number of gap tapes attached to the display panel.

18. A driving method of a display device comprising:

sensing, for each of pixels of a display panel, electrical properties of the pixels to generate a sensed data;

analyzing the sensed data to detect a sensing error; and resetting a timing controller configured to control operation timing of a display panel driver that drives the display panel, when the sensing error is detected, wherein said sensing electrical properties of the pixels includes:

sensing electrical properties of pixels disposed on pixel lines spaced at equal intervals in the display panel.

19. The driving method of a display device of claim 18, wherein said analyzing the sensed data to detect a sensing error includes:

calculating an average value of sensed data obtained from the pixel lines spaced at equal intervals and an average value of sensed data obtained from all pixel lines of the display panel; and determining that the sensing error has occurred when the average value of sensed data obtained from the pixel lines spaced at equal intervals is greater than a sum of the average value of sensed data obtained from all pixel lines of the display panel and a preset threshold value.

* * * * *

UNITED STATES PATENT AND TRADEMARK OFFICE
CERTIFICATE OF CORRECTION

| | | |
|---|---|---|
| PATENT NO. | : 11,645,979 B2 | Page 1 of 1 |
| APPLICATION NO. | : 17/509632 | |
| DATED | : May 9, 2023 | |
| INVENTOR(S) | : Cheol Su Lee et al. | |

It is certified that error appears in the above-identified patent and that said Letters Patent is hereby corrected as shown below:

In the Claims

Column 24, Claim 1, Line 58:
"shifter and supplying, supply a gate signal"
Should read:
--shifter and supply a gate signal--.

Column 28, Claim 18, Line 20:
"configured to control operation"
Should read:
--configured to control an operation--.

Signed and Sealed this
Ninth Day of July, 2024

Katherine Kelly Vidal
*Director of the United States Patent and Trademark Office*